(12) United States Patent
Yamamuro

(10) Patent No.: US 6,676,743 B2
(45) Date of Patent: Jan. 13, 2004

(54) LIGHTWEIGHT CLAY AND MANUFACTURING METHOD THEREOF

(76) Inventor: Toshiyuki Yamamuro, 19, Nakamaru, Kanagawa-ku, Yokohama-shi, Kanagawa 221-0803 (JP)

(*) Notice: Subject to any disclaimer, the term of this patent is extended or adjusted under 35 U.S.C. 154(b) by 0 days.

(21) Appl. No.: 10/364,457

(22) Filed: Feb. 12, 2003

(65) Prior Publication Data

US 2003/0150361 A1 Aug. 14, 2003

Related U.S. Application Data

(63) Continuation of application No. PCT/JP02/02479, filed on Mar. 15, 2002.

(30) Foreign Application Priority Data

Mar. 16, 2001 (JP) .......................... 2001-075119
May 31, 2001 (JP) .......................... 2001-165214
May 31, 2001 (JP) .......................... 2001-165370

(51) Int. Cl.[7] .................. C04B 14/04; C04B 14/10
(52) U.S. Cl. .................. 106/468; 106/416; 106/484; 106/486; 106/487; 106/488; 106/489; 501/141
(58) Field of Search ................ 106/416, 484, 106/486, 487, 488, 489; 501/141

(56) References Cited

U.S. PATENT DOCUMENTS 6,030,443 A * 2/2000 Bock et al. ............... 106/217.5
6,537,363 B1 * 3/2003 Golley et al. ............. 106/486

FOREIGN PATENT DOCUMENTS

| JP | 51-893 | 1/1976 |
|---|---|---|
| JP | 57-16356 | 4/1982 |
| JP | 59-50615 | 12/1984 |
| JP | 2-123390 | 5/1990 |
| JP | 10268755 | 10/1998 |
| JP | 10319834 | 12/1998 |
| JP | 11209156 | 8/1999 |
| JP | 11-209156 | * 8/1999 |
| JP | 1-234081 | 8/2001 |
| JP | 2001-234081 | * 8/2001 |

OTHER PUBLICATIONS

English Language Abstract of JP 51–893.
English Language Abstract of JP 59–50615.
English Language Abstract of JP 57–16356.
English Language Abstract of JP 2–123390.
English Language Abstract of JP 10–268755.
English Language Abstract of JP 11–209156.
English Language Abstract of JP 10–319834.
English Language Abstract of JP 2001–234081.

* cited by examiner

Primary Examiner—C. Melissa Koslow
Assistant Examiner—Shalie Manlove
(74) Attorney, Agent, or Firm—Greenblum & Bernstein P.L.C.

(57) ABSTRACT

The present invention provides a lightweight clay which can be easily molded into a given shape, exhibits proper lightweight characteristics and storing characteristics, and can be manufactured at a low cost, and a manufacturing method thereof. In such a lightweight clay and the manufacturing method thereof, an average particle size of the organic hollow micro spheres is set to a value which falls within a range of 15 to 150 $\mu$m and, an addition quantity of the organic hollow micro spheres is set to a value which falls within a range of 0.1 to 6 weight % with respect to a total quantity of the lightweight clay, and whiteness degree (WL) measured in accordance with JIS L 0803 is set to not less than 50.

17 Claims, 7 Drawing Sheets

(FIG. 4)
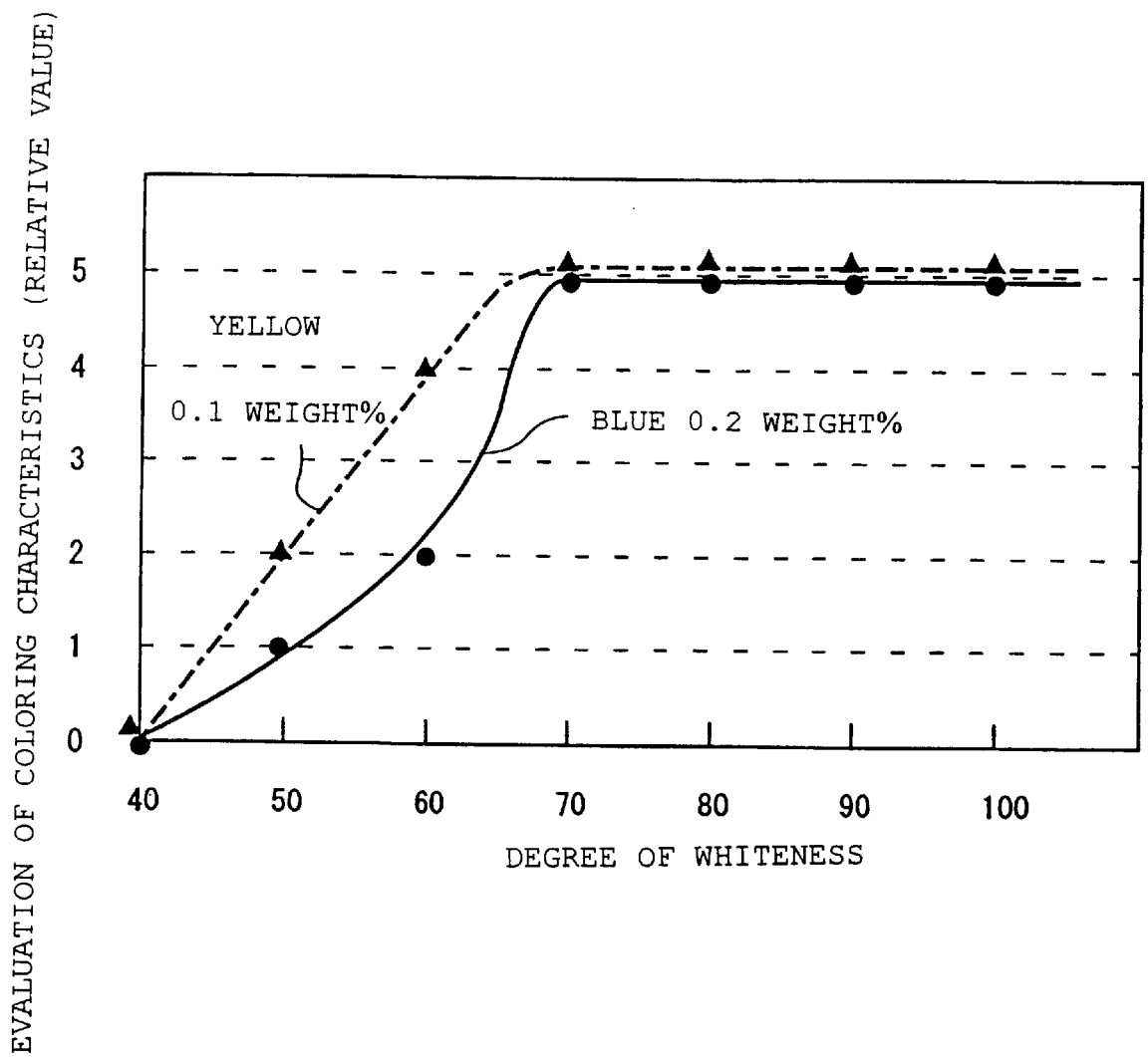

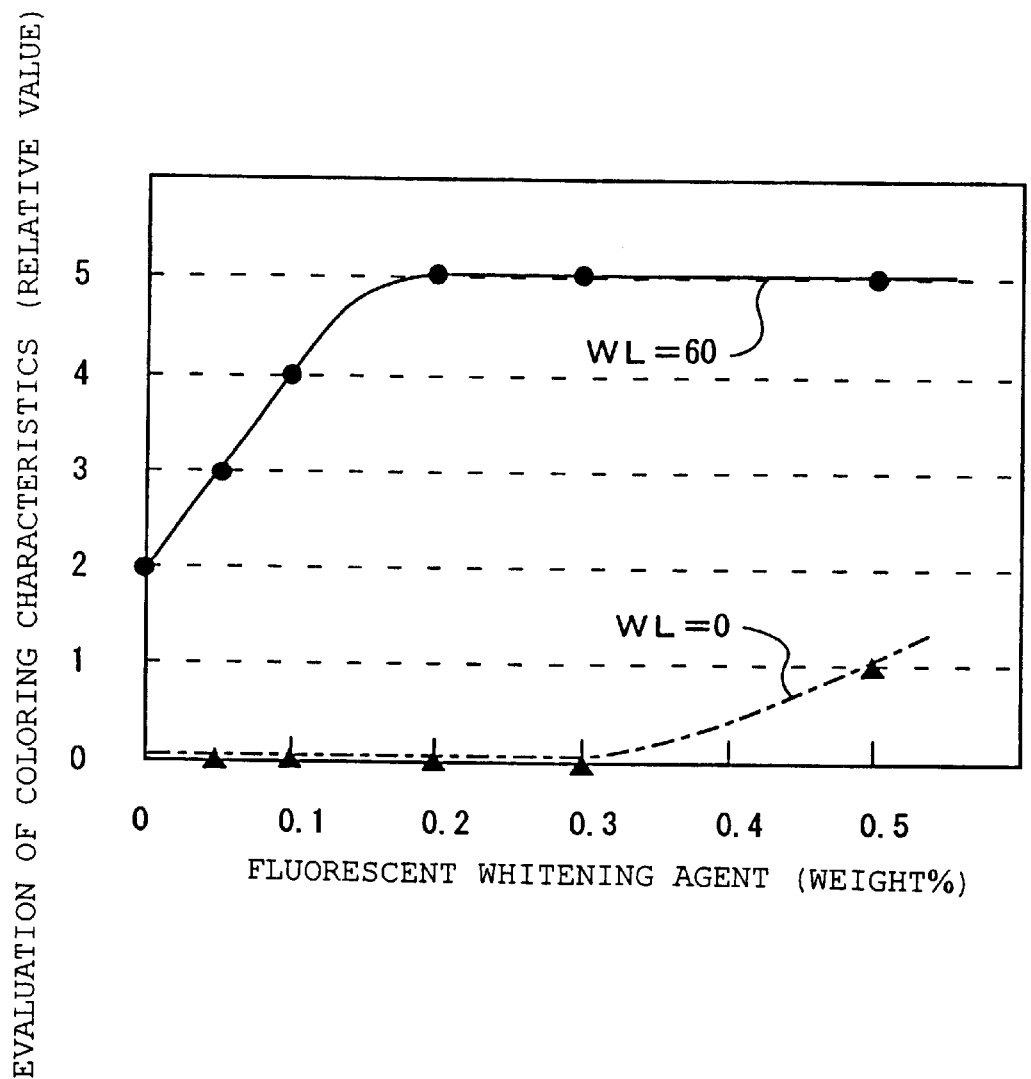

(FIG. 6)
(a)
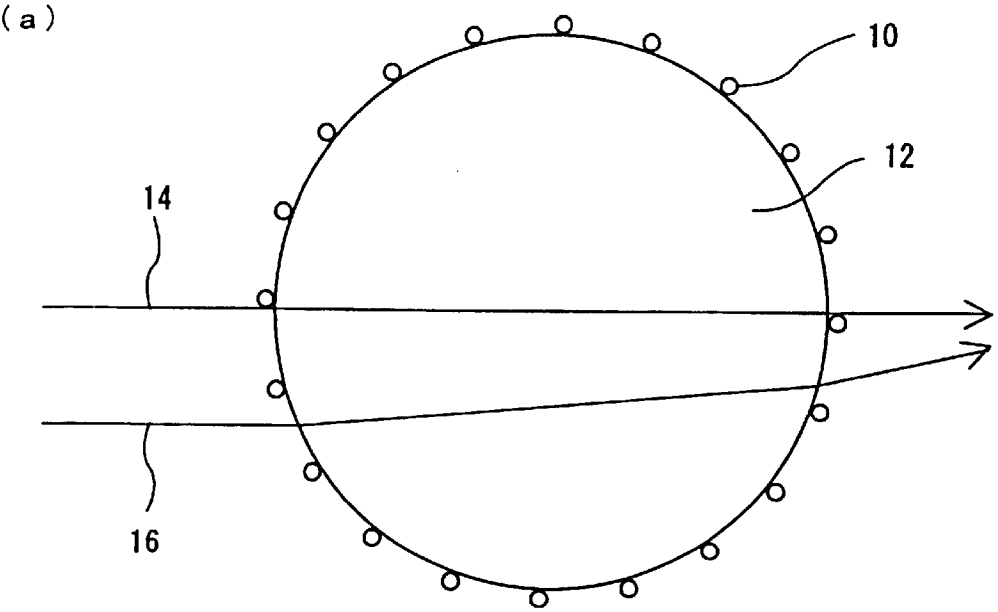
(b)
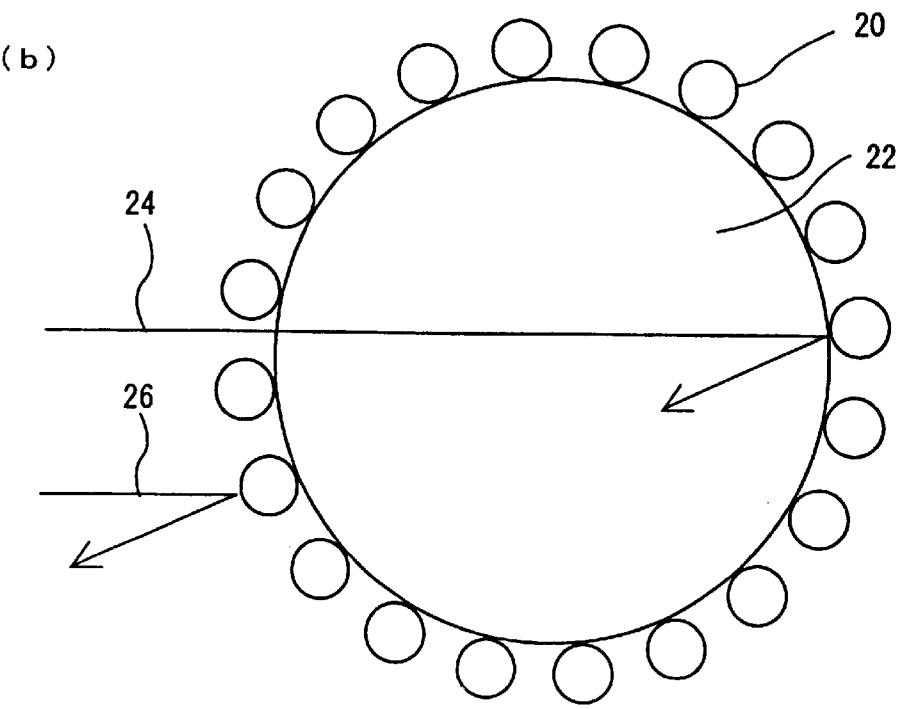

(FIG. 7)
(a)
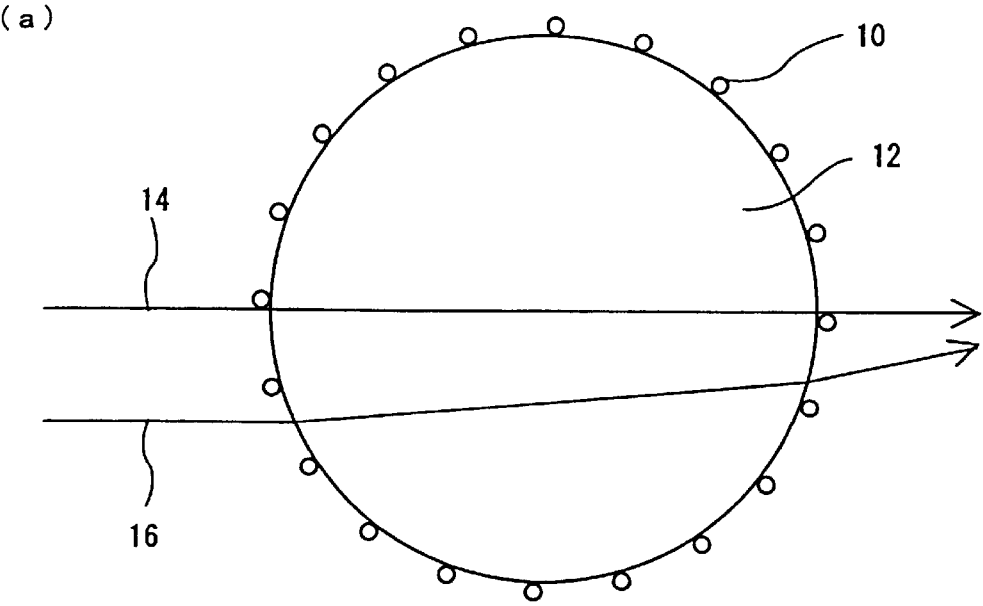
(b)
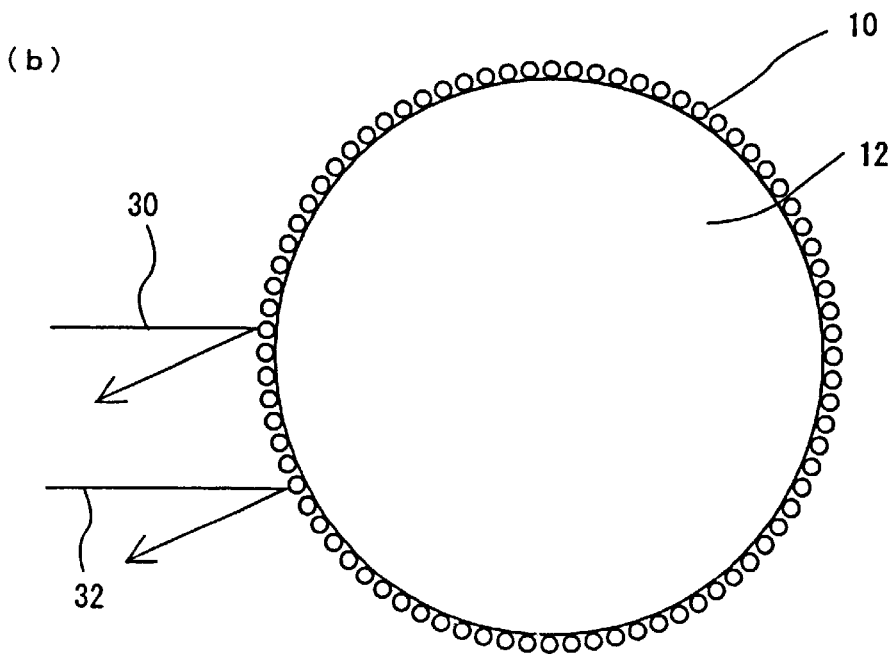

LIGHTWEIGHT CLAY AND MANUFACTURING METHOD THEREOF

CROSS-REFERENCE TO RELATED APPLICATION

This is a continuation of International Application No. PCT/JP02/02479, filed Mar. 15, 2002. The International Application was not published under PCT Article 21(2) in English.

BACKGROUND OF THE INVENTION

1. Field of the Invention

The present invention relates to a lightweight clay and a manufacturing method thereof, and more particularly to a lightweight clay, which has proper lightweight characteristics and proper moldability, exhibits excellent coloring characteristics and reduces a manufacturing cost and a manufacturing method thereof.

2. Description of the Related Art

The conventional clay which has been used in fine art and as school teaching material or the like, in many cases, is configured such that the clay contains a granular material or a decomposed product of dead plant bodies as a main material and adds additives such as a binder for binding the granular materials, flavor, pigment, water, oil and the like to the main material. Accordingly, there has been observed a drawback that the conventional clay has large weight and exhibits poor availability.

In view of the above circumstance, JP51-893B discloses a lightweight clay, which is constituted by using pulverized foamed styrol as a main material and by adding pulpwood, water and the like to the foamed styrol.

However, the pulverized foamed styrol forms a large number of open pores on a surface thereof in view of the structure thereof and water or the like permeates these open pores and hence, the clay becomes rich in a water content or a liquid content. Accordingly, there still remains a drawback on lightweighting that the weight of the lightweight clay as a whole cannot be remarkably reduced. Further, there has been also observed a drawback on manufacturing that the micronization of the foamed styrol is not easy and hence, it is difficult to uniformly mix the foamed styrol with the blending materials.

Further, JP59-50615B discloses a polish-able molding clay in which 30 to 40 weight % of micro hollow powdery bodies made of a foamed inorganic material having a particle size of less than 150 μm and a bulk density of not more than 0.6, 3 to 13 weight % of fiber powder having a fiber length of not more than 10 mm, 31 to 60 weight % of talc powder having a particle size of not more than 150 μm, 3 to 8 weight % of a water-soluble synthetic paste material in a single or a plural form, and water are mixed and the penetration is adjusted to 100 to 350. Further, a plastic art material having the similar composition is disclosed in JP57-16356B.

However, such a molding clay or plastic art material contains a large amount of micro hollow powdery materials formed of the foamed inorganic material and rock powder and hence, it is not easy to mix or disperse these materials. Furthermore, the obtained molding clay or plastic art material exhibits poor handling characteristics and moldability. Further, there has been a drawback that these clays push up a manufacturing cost.

Still further, in JP2-123390A, there is proposed a lightweight clay which is lightweighted, exhibits high whiteness degree and enables easy incineration treatment by blending 3 to 20 weight % of organic hollow micro spheres having an outer shell made of copolymer containing acrylic nitrile or vinylidene chloride, 5 to 20 weight % of a synthetic binder (carboxymethylcellulose), 10 to 30 weight % of fiber powder and 50 to 60 weight % of water with respect to a total quantity of the clay.

That is, for example, when the blending ratio of the organic hollow micro spheres is less than 3 weight %, a given target weight cannot be achieved, while when the blending ratio of the organic hollow micro spheres exceeds 20 weight %, the nature of the lightweight clay is damaged.

Further, when the blending ratio of the fiber powder is less than 10 weight %, the working of the fiber powder as the binder becomes insufficient, while when the blending ratio of the fiber powder exceeds 30 weight %, the lightweight clay preserves a large quantity of water and hence, the lightweighting characteristics of the lightweight clay is damaged.

Further, when the blending ratio of water is less than 50 weight %, the molding operation becomes difficult, while when the blending ratio of water exceeds 60 weight %, the lightweight clay is softened so that the lightweight clay exhibits poor moldability. Furthermore, the lightweighting characteristics of the lightweight clay are damaged.

However, an addition quantity of the organic hollow micro spheres in such a lightweight clay is large, that is, 20 weight % at maximum and hence, it is not easy to mix or disperse the organic hollow micro spheres. Further, the obtained lightweight clay excessively has the lightweighting characteristics so that there has been a problem that the lightweight clay exhibits poor handling and moldability and a manufacturing cost is pushed up.

Further, since an addition quantity of the organic hollow micro spheres is large in such a lightweight clay, there has been also a drawback that the organic hollow micro spheres in a state that a foamed gas (foamed liquid) remains, that is, so-called un-expanding organic hollow micro spheres are present in a large quantity. Accordingly, assuming a case in which the lightweight clay is stored for a long period by covering the lightweight clay with a packaging material such as a polyethylene film, when an ambient temperature is elevated during a summer season or the like and the lightweight clay is held in high temperature state, there has been observed a drawback that the lightweight clay which is covered with the packaging material is swelled to a volume which is approximately 1.2 to 3 times as large as an initial volume due to the remaining foamed gas (hereinafter referred to as a swelling problem) has been observed.

Further, since an addition quantity of the organic hollow micro spheres is large in such a lightweight clay, when color elements are added, there has been also a drawback that the organic hollow micro spheres interrupt the dispersion of the color elements so that it is impossible to obtain the excellent coloring characteristics.

Further, JP10-268755A discloses a lightweight clay, which is lightweighted, requires small number of drying days and exhibits small shrinkage ratio. Such a lightweight clay is produced by blending 30 to 70 parts by weight of glass micro hollow spheres having a particle size of 1 to 200 μm, 30 to 60 parts by weight of fiber powder, 10 to 50 parts by weight of carboxymethylcellulose and 200 to 400 parts by weight of water (using a total quantity of the glass micro hollow spheres, fiber powder and carboxymethylcellulose as the reference).

That is, for example, when the blending ratio of the glass micro hollow spheres is less than 30 parts by weight, it is difficult to achieve given lightweighting characteristics, while when the blending ratio of the glass micro hollow spheres exceeds 70 parts by weight, the shrinkage and cracks in the lightweight clay are increased in number.

Further, when the blending ratio of the fiber powder is below 30 parts by weight, the shrinkage and cracks in the lightweight clay are increased in number, while when the blending ratio of the fiber powder exceeds 60 parts by weight, the lightweight clay preserves a large quantity of water and hence, the lightweighting is damaged.

Further, when the blending ratio of water is below 200 parts by weight, the molding operation of the lightweight clay becomes difficult, while when the blending ratio of water exceeds 400 parts by weight, the lightweight clay is softened and exhibits poor moldability. Further, the lightweight clay is liable to be stuck to a hand.

However, with respect to such a lightweight clay, since the adding rates of the glass micro spheres and the fiber powder are large, there has been a drawback that the lightweight clay exhibits poor moldability and a manufacturing cost is pushed up.

Further, since an addition quantity of the glass organic hollow micro spheres is large in such a lightweight clay, when color elements are added, the glass organic hollow micro spheres interrupt the dispersion of the color elements so that there has been observed a drawback that the excellent coloring characteristics is not obtained.

In view of the above, inventors of the present invention have studied the average particle size, the whiteness degree (WL) or an addition quantity of the organic hollow micro spheres in the lightweight clay to an extent that they reach respective values which are considered to cause problems conventionally. As a result of the studies, the inventors have found that these factors interact with each other and affect the whiteness degree (WL), the coloring characteristics, and the moldability, lightweight characteristics of the lightweight clay or the swelling problem of the lightweight clay.

Accordingly, it is an object of the present invention to provide a lightweight clay and a manufacturing method thereof in which the lightweight clay exhibits excellent coloring characteristics, moldability and lightweight characteristics and can solve the swelling problem even when the lightweight clay is subjected to a high temperature state when the lightweight clay is stored for a long period in a state that the lightweight clay is covered with a packing material or when an ambient temperature is elevated during a summer season thus obtaining excellent storing characteristics by solving the swelling problem.

SUMMARY OF THE INVENTION

According to the present invention, there is provided a lightweight clay which contains organic hollow micro spheres and a binder resin, wherein an average particle size of the organic hollow micro spheres is set to a value which falls within a range of 15 to 150 $\mu$m, an addition quantity of the organic hollow micro spheres is set to a value not more than 6 weight % with respect to a total quantity, and whiteness degree (WL) of the lightweight clay which is measured in accordance with JIS L 0803 is set to a value of not less than 50, whereby the above-mentioned drawbacks can be solved.

That is, by controlling the whiteness degree (WL) of the lightweight clay while controlling the average particle size of the organic hollow micro spheres in a fixed range in this manner, it is possible to enhance the aesthetic appearance and, at the same time, it is possible to obtain the excellent coloring characteristics when coloring elements or the like are added to the lightweight clay for coloring.

Further, since an addition quantity of the organic hollow micro spheres is relatively small, even when the color elements are added to the lightweight clay for coloring, the organic hollow micro spheres do not interrupt the dispersion of the color elements and hence, the lightweight clay can obtain more excellent coloring characteristics.

Further, by setting an addition quantity of the organic hollow micro spheres to a value which is considerably smaller than an upper limit (20 weight %) of an addition quantity of the organic hollow micro spheres of a conventional lightweight clay, it is possible to obtain the sufficient and proper lightweighting (reduction of weight) of the lightweight clay and, at the same time, it is possible to obtain the lightweight clay which exhibits the excellent moldability.

Further, since an addition quantity of the organic hollow micro spheres is relatively small, not only the mixing and dispersion of the organic hollow micro spheres into the lightweight clay is facilitated, but also a quantity of unexpanded organic hollow micro spheres present in the lightweight clay can be reduced and a use quantity of the expensive organic hollow micro spheres can be reduced so that it is possible to obtain the excellent storing characteristics (expansion characteristics) and it is also possible to reduce a manufacturing cost to a low level.

Further, according to another mode of the present invention, in a method for manufacturing a lightweight clay containing organic hollow micro spheres and a binder resin, an addition quantity of the organic hollow micro spheres having an average particle size which is set to a value which falls within a range of 15 to 150 $\mu$m is set to a value of not more than 6 weight % with respect to a total quantity, the organic hollow micro spheres and the binder resin are mixed using a kneader so as to set whiteness degree (WL) of the lightweight clay which is measured in accordance with JIS L 0803 to a value of not less than 50.

By exercising such a manufacturing method, it is possible to efficiently obtain the lightweight clay which exhibits excellent moldability and lightweight characteristics, can exhibit extremely distinct whiteness, and exhibits further excellent coloring characteristics when color elements are added.

BRIEF DESCRIPTION OF THE DRAWINGS

FIG. 4 is a characteristic graph showing the relationship between whiteness degree (WL) in a lightweight clay and coloring characteristics.

FIG. 5 is a characteristic graph showing the relationship between an addition quantity of a fluorescent whitening agent in a lightweight clay and coloring characteristics.

FIG. 6(a) is a view, which is served for explaining the relationship between an average particle size of color pigments in a lightweight clay of the present invention and optical transmitting characteristics (coloring characteristics).

FIG. 6(b) is a drawing, which is served for explaining the relationship between an average particle size of color pigments in a conventional lightweight clay and optical transmitting characteristics (coloring characteristics).

FIG. 7(a) is a drawing, which is served for explaining the relationship between an addition quantity of color pigments in a lightweight clay of the present invention and optical transmitting characteristics (coloring characteristics).

FIG. 7(b) is a drawing, which is served for explaining the relationship between an addition quantity of color pigments in a conventional lightweight clay and optical transmitting characteristics (coloring characteristics).

DESCRIPTION OF THE PREFERRED EMBODIMENTS

Figure 1:
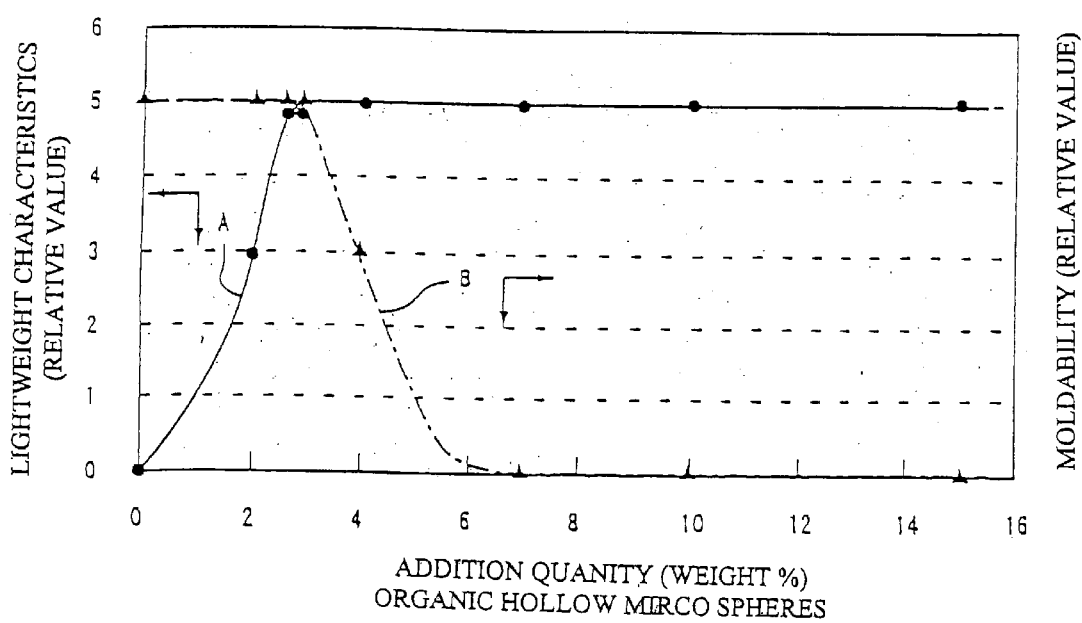
FIG. 1 is a characteristic graph showing the relationship between an addition quantity of organic hollow micro spheres in a lightweight clay and lightweight characteristics and moldability of the lightweight clay.

An embodiment of the present invention is directed to a lightweight clay which contains organic hollow micro spheres, a binder resin made of polar compound, fibers, water and color elements, wherein an average particle size of the organic hollow micro spheres is set to a value which falls within a range of about 15 to 150 $\mu$m, an addition quantity of the organic hollow micro spheres is set to a value not more than 6 weight % with respect to a total quantity of the lightweight clay, and whiteness degree (WL) of the lightweight clay which is measured in accordance with JIS L 0803 is set to a value of not less than 50, and a manufacturing method of the lightweight clay.

Hereinafter, respective constitutional elements such as organic hollow micro spheres and the polar compound are explained in a separated manner.

1. Organic Hollow Micro Spheres (1) Type 1

As the organic hollow micro spheres, any micro spheres each of which has an outer shell (shell wall) made of an organic material and has pores in the inside thereof can be preferably used.

As such organic hollow micro spheres, it is preferable to use the micro spheres in which, for example, the outer shell of each micro sphere is formed of vinylidene chloride-acrylic nitrile copolymer resins, vinyl acetate-acrylic nitrile copolymer resins, methyl methacrylate-acrylic nitrile copolymer resins, acrylic nitrile resins or the like and the micro sphere contains gas or liquid therein.

Among these organic hollow micro spheres, particularly, it is preferable to use the organic hollow micro spheres having outer shells formed of vinylidene chloride-acrylic nitrile copolymer resin since it is possible to swell the micro spheres to a given size at the time of heating while ensuring easy manufacturing. However, when the temperature at the time of foaming is high or when the temperature distribution is not uniform, there may be a case that the organic hollow micro spheres having outer shells formed of vinylidene chloride-acrylic nitrile copolymer resin are colored in brown or charcoal brown or a case that the whiteness degree (WL) assumes a value below 50. Accordingly, an attention must be paid to such organic hollow micro spheres.

Further, it is preferable to use the organic hollow micro spheres having outer shells formed of vinyl acetate-acrylic nitrile copolymer resin, methyl methacrylate-acrylic nitrile copolymer resin, acrylic nitrile resin or the like since such organic hollow micro spheres exhibit high whitening characteristics and the whiteness degree (WL) can be adjusted easily.

(2) Type 2

Further, besides the organic hollow micro spheres, it is preferable to use inorganic hollow micro spheres having outer shells formed of an inorganic material such as a glass material, for example, in combination with the hollow organic micro spheres.

Such inorganic hollow micro spheres are non-colored transparent and exhibits a high pressure resistant strength. For example, a survival rate of the inorganic hollow micro spheres after pressurizing with a measuring pressure of 750 psi (1 psi=6.90×10$^3$ N, 1 kgf=9.807 N/cm$^2$) is about 90 to 92 (volume %). Further, the inorganic hollow micro spheres have characteristics that they are light in weight.

Accordingly, by using the organic hollow micro spheres and the inorganic hollow micro spheres in combination, it is possible to remarkably reduce the weight of the lightweight clay per a unit volume. Further, since the organic hollow micro spheres are present around the inorganic hollow micro spheres, the organic hollow micro spheres play a role of a cushion material and hence, the organic hollow micro spheres can effectively prevent the rupture of the inorganic hollow micro spheres and can enhance the dispersing characteristics of the inorganic hollow micro spheres.

Further, due to such a combined use of the organic hollow micro spheres and the inorganic hollow micro spheres, it is possible to enhance the coloring characteristics in relation to color elements, to enhance the shape holding characteristics of the lightweight clay, and to reduce the shrinkage rate.

Still further, due to such a combined use of the organic hollow micro spheres and the inorganic hollow micro spheres, a use quantity of the organic hollow micro spheres can be relatively reduced and hence, the swelling problem attributed to the un-expanding organic hollow micro spheres can be effectively prevented whereby it is possible to achieve the more excellent storing characteristics.

(3) Whiteness Degree

Further, it is preferable that the color of the organic hollow micro spheres is white or colors, which approximate white. That is, it is preferable that the whiteness degree (WL) of the organic hollow micro spheres, which is measured in accordance with JIS L 0803, assumes a value of not less than 50.

The reason for selecting such a value is that among various types of organic hollow micro spheres, with the use of such organic hollow micro spheres which are rich in whitening characteristics having the whiteness degree (WL) of not less than 50, not only the adjustment of the whiteness degree (WL) of the lightweight clay can be facilitated, but also it is possible to obtain the lightweight clay which exhibits the more excellent coloring characteristics when the color elements are added. To the contrary, when the whiteness degree (WL) assumes a value of less than 50, the organic hollow micro spheres exhibit the brownish color, and when the color elements are added to the lightweight clay, particularly when the color elements are added to the lightweight clay together with the whitish color elements and the yellowish color elements, there is a possibility that these pigments are mixed thus remarkably reducing the coloring characteristics.

However, when the value of the whiteness degree (WL) becomes excessively high, there may be a case that the composition materials of the organic hollow micro spheres are excessively restricted.

Accordingly, it is preferable to set the whiteness degree (WL) of such organic hollow micro spheres to a value, which falls within a range of about 70 to 99.9. It is more preferable to set the whiteness degree to a value, which falls within a range of about 80 to 99.

Here, the adjustment of the value of the whiteness degree (WL) can be easily achieved by adding white particles such as titanium oxide or silica into the outer shells of the organic hollow micro spheres or covering the outer shells of the organic hollow micro spheres with these white particles. Further, the adjustment of the whiteness degree (WL) can be also easily achieved by reducing a use quantity of a vinyl chloride resin, a vinylidene chloride resin or a formaldehyde system resin (a phenol resin, a melamine resin, a guanamine resin, a urea-formaldehyde resin), to be more specific, by setting such use quantity to a value of not more than 10 weight % in the outer shells of the organic hollow micro spheres. Further, the whiteness degree (WL) can be easily adjusted also by adding a fluorescent whitening agent which will be explained later into the outer shells of the organic hollow micro spheres or by coating such outer shells with such a fluorescent whitening agent.

Although the whiteness degree (WL) of the organic hollow micro spheres and the whiteness degree (WL) of the lightweight clay which will be explained later can be measured in accordance with JIS L 0803, to be more specific, it is possible to measure the whiteness degree using a reflectometer (TR-1000D type or TC-1800MK2 of TOKYO DENSHOKU LTD., for example).

(4) Average Particle Size 1

Further, the average particle size of the organic hollow micro spheres is set to a value, which falls within a range of about 15 to 150 $\mu$m.

The reason is that, when the average particle size of the organic hollow micro spheres assumes a value less than 15 $\mu$m, there arises a case that the moldability and the whiteness degree (WL) of the lightweight clay are reduced or the lightweighting of the lightweight clay when a given quantity of the organic hollow micro spheres is added becomes difficult. On the other hand, when the average particle size of the organic hollow micro spheres exceeds 150 $\mu$m, there arises a case that the mixing and dispersion become difficult or the moldability of the lightweight clay is reduced.

Accordingly, it is more preferable to set the average particle size of the organic hollow micro spheres to a value which falls within a range of about 50 to 130 $\mu$m and it is further preferable to set such an average particle size to a value which falls within a range of about 70 to 120 $\mu$m.

Here, the average particle size of the organic hollow micro spheres can be computed by taking an image of organic hollow micro spheres into an optical microscope and subsequently by computing the average particle size based on the image using an image processing apparatus.

(5) Average Particle Size 2

Further, in determining the average particle size of the organic hollow micro spheres, it is preferable to take an average particle size of color elements, which will be explained later into account.

That is, assuming the average particle size of the color elements as D1 and the average particle size of the organic hollow micro spheres as D2, it is preferable to set a ratio of D2/D1 to a value which falls within a range of about 10 to 50,000.

The reason is that when the ratio of D2/D1 assumes a value below 10, there arises a case that the color elements are not uniformly distributed and hence, the coloring of the organic hollow micro spheres is interrupted. On the other hand, when the ratio of D2/D1 assumes a value which exceeds 50,000, the color elements are liable to be easily flocculated and hence, the color elements are not uniformly dispersed thus giving rise to a possibility that the coloring characteristics are deteriorated.

Accordingly, to enhance the coloring characteristics obtained by the color elements, it is more preferable to set the ratio of D2/D1 to a value, which falls within a range of about 50 to 10,000, and it is further preferable to set the ratio of D2/D1 to a value, which falls within a range of about 100 to 1,000.

(6) Addition Quantity

Further, the present invention is characterized in that an addition quantity of the organic hollow micro spheres is set to a value which falls within a range of about 0.1 to 6 weight % with respect to a total quantity.

The reason is that when an addition quantity of the organic hollow micro spheres assumes a value less than 0.1 weight %, lightweighting of the lightweight clay becomes difficult. On the other hand, when the addition quantity of the organic hollow micro spheres assumes a value which exceeds 6 weight %, the moldability and the handling of the lightweight clay are remarkably reduced and, at the same time, the remaining un-expanding organic hollow micro spheres are increased in number so that when the lightweight clay is stored for a long period in a state that the lightweight clay is covered with a packaging material or when the ambient temperature is elevated during a summer season or the like, the packaging material is swelled so that the storing characteristics are remarkably reduced. Further, since the organic hollow micro spheres are extremely expensive, when an addition quantity assumes the value, which exceeds 6 weight %, the cost of the obtained lightweight clay becomes extremely expensive.

Accordingly, to achieve a more favorable balance between the moldability and the swelling characteristics of the lightweight clay and the lightweight characteristics or the like of the lightweight clay, it is more preferable to set an addition quantity of the organic hollow micro spheres to a value which falls within a range of about 0.5 to 4 weight %, and it is further preferable to set such an addition quantity of the organic hollow micro spheres to a value which falls within a range of about 1 to 3 weight %.

Further, it is preferable to determine an addition quantity of the organic hollow micro spheres by taking the density of the binder resin into consideration. That is, by determining an addition quantity of the organic hollow micro spheres by taking the density of the binder resin into consideration, it is possible to economically provide the lightweight clay having the uniform density as a final product.

To be more specific, it is preferable that when the density of the constituent materials other than the organic hollow micro spheres is less than 0.5 to 0.8 g/cm$^3$, an addition quantity of the organic hollow micro spheres is set to a value which falls within a range of 0.1 to less than 3 weight % with respect to a total quantity of the lightweight clay, and when the density of the constituent materials other than the organic hollow micro spheres is about 0.8 to 58 g/cm$^3$, an addition quantity of the organic hollow micro spheres is set to a value which falls within a range of about 0.1 to 6 weight % with respect to a total quantity of the lightweight clay.

Here, the relationship between an addition quantity of the organic hollow micro spheres and the lightweight characteristics, the moldability and the swelling characteristics of the lightweight clay and the relationship between an addition quantity of the organic hollow micro spheres and a manufacturing cost are explained in detail respectively.

FIG. 1 is a graph in which data on the lightweight characteristics and the moldability shown in Table 1 are expressed as numerals, wherein the data are calculated as numerical values such that the evaluation "very good" is given an evaluation point 5, the evaluation "good" is given an evaluation point 3, the evaluation "fair" is given an evaluation point 1, and the evaluation "bad" is given an evaluation point 0.

Further, an addition quantity (weight %) of the organic hollow micro spheres is taken on an axis of abscissas and the lightweight characteristics (relative value) is taken on a left axis of ordinates, wherein a curve A indicates the relationship between an addition quantity of the organic hollow micro spheres and the lightweight characteristics. On the other hand, the moldability (relative value) is taken on a right axis of ordinates in FIG. 1 and the relationship between an addition quantity (weight %) of the organic hollow micro spheres and the moldability is indicated by a curve B.

As can be understood from the characteristic curves shown in FIG. 1, the larger an addition quantity of the organic hollow micro spheres, the evaluation of the lightweight characteristics of the lightweight clay is enhanced and hence, it is necessary to set an addition quantity of the organic hollow micro squares to a value of not less than 0.1 weight % to obtain the proper lightweight characteristics. On the other hand, with respect to the evaluation of the moldability of the lightweight clay, the evaluation of moldability is drastically reduced after an addition quantity of the organic hollow micro spheres reaches 3 weight % and thereafter. That is, the evaluation is reduced to 1 at an addition quantity of 5 weight % and is substantially reduced to 0 at an addition quantity of 7 weight %.

Accordingly, by setting an addition quantity of the organic hollow micro spheres to a value which falls within a range of about 0.1 to 6 weight %, it is possible to take a favorable balance between the lightweight characteristics and the moldability of the lightweight clay. Further, it is also appreciated that by setting an addition quantity of the organic hollow micro spheres to a value, which falls within a range of 1 to less than 3 weight %, it is possible to take a more excellent balance between these characteristics.

Figure 2:
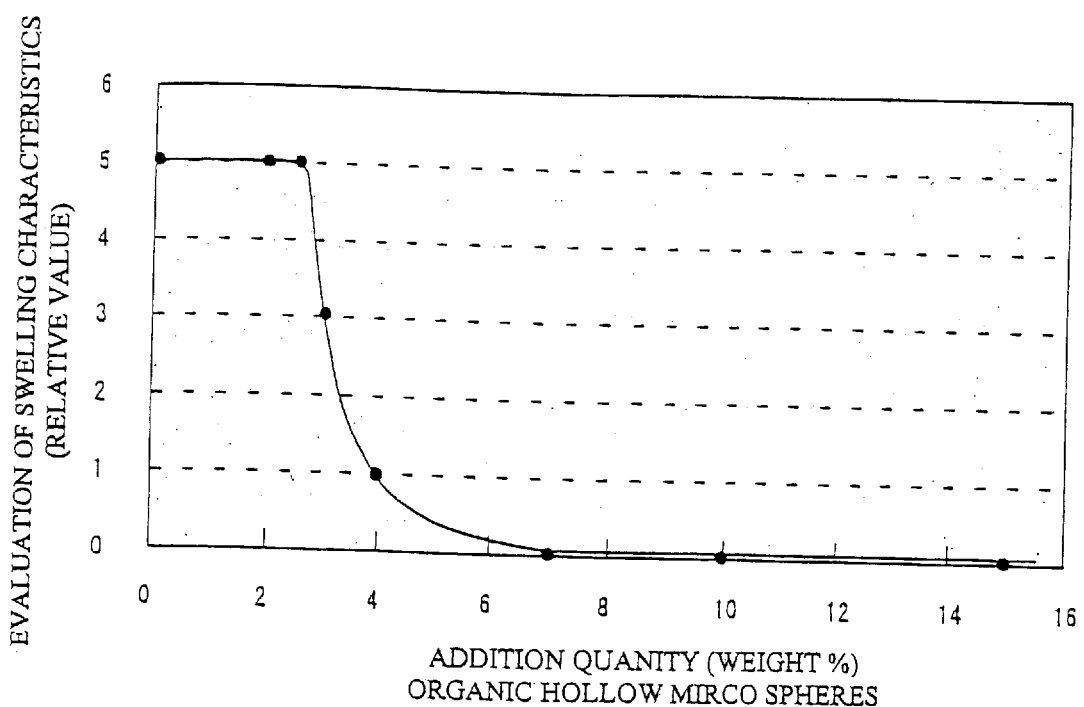
FIG. 2 is a characteristic graph showing the relationship between an addition quantity of organic hollow micro spheres in a lightweight clay and a result of evaluation of swelling characteristics.

Further, FIG. 2 is a graph in which data on the swelling characteristics shown in Table 1 are expressed as numerals, wherein the data are calculated as numerical values such that the evaluation "very good" is given 5 points, the evaluation "good" is given 3 points, the evaluation "fair" is given 1 point, and the evaluation "bad" is given 0 point.

In FIG. 2, an addition quantity (weight %) of the organic hollow micro spheres is taken on an axis of abscissas and the swelling characteristics (relative value) is taken on a left axis of ordinates.

As can be understood from a characteristic curve shown in FIG. 2, the larger an addition quantity of the organic hollow micro spheres, the evaluation result of the swelling characteristics is lowered. To be more specific, the evaluation of the swelling characteristics is drastically decreased after an addition quantity of organic hollow micro spheres reaches 3 weight % and thereafter. That is, the evaluation of swelling characteristics is lowered to approximately 1 at an addition quantity of 5 weight % and to substantially 0 at an addition quantity of 7 weight %.

Accordingly, it is appreciated that by setting an addition quantity of the organic hollow micro spheres to a value which falls within a range of 0.1 to 6 weight % by taking the results shown in FIG. 1 and FIG. 2 into account, it is possible to take a favorable balance not only between an addition quantity and the lightweight characteristics and the moldability of the lightweight clay but also between an addition quantity and a swelling problem at the time of storing. Further, it is also appreciated that by setting an addition quantity of the organic hollow micro spheres to a value, which falls within a range of 1 to less than 3 weight %, it is possible to take a more excellent balance with respect to these characteristics.

Figure 3:
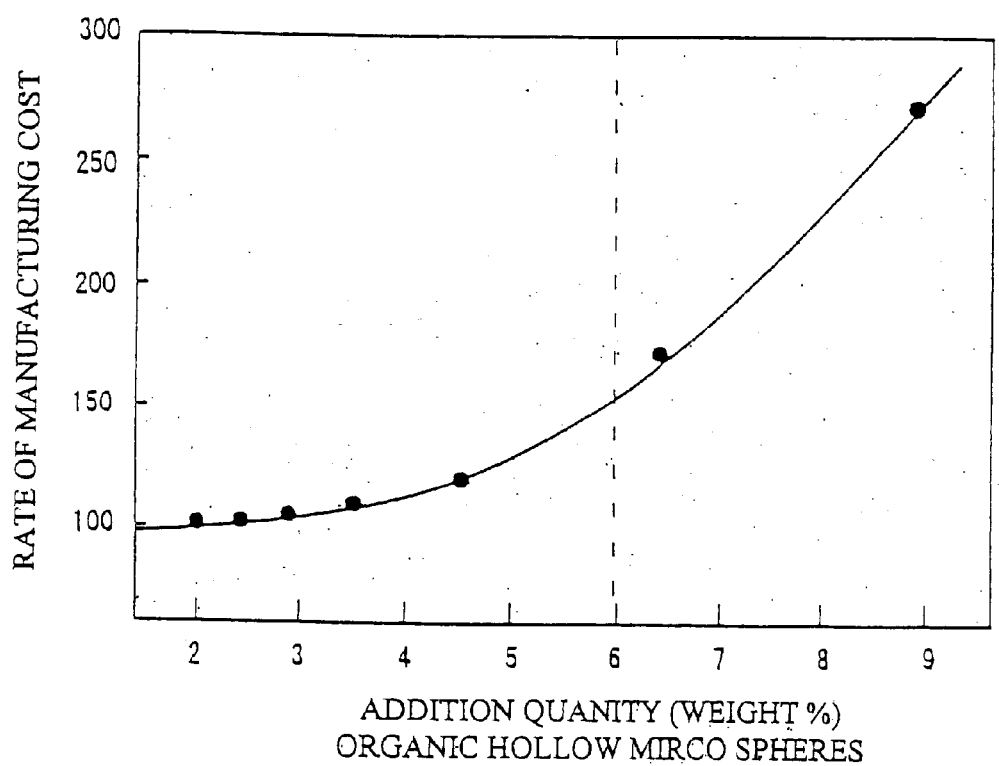
FIG. 3 is a characteristic graph showing the relationship between an addition quantity of organic hollow micro spheres in a lightweight clay and a manufacturing cost rate.

Further, FIG. 3 shows the relationship between an addition quantity of the organic hollow micro spheres of the lightweight clay and a manufacturing cost rate of the lightweight clay at respective addition quantities provided that the manufacturing cost of the lightweight clay when an addition quantity of the organic hollow micro spheres is 2 weight % is assumed as 100%.

As can be understood from a characteristic curve shown in FIG. 3, the larger an addition quantity of the organic hollow micro spheres, there exists a tendency that the manufacturing cost rate of the lightweight clay is elevated. Particularly, the manufacturing cost rate is extremely elevated when an addition quantity of the hollow micro spheres reaches 6 weight % and thereafter. That is, the manufacturing cost rate is elevated to about 150 % at an addition quantity of 6 weight %, and the manufacturing cost rate is further elevated to about 220 % at an addition quantity of 7 weight %.

Accordingly, it is appreciated that by setting an addition quantity of the organic hollow micro spheres to a value which falls within a range of about 0.1 to 6 weight % by taking the results shown in FIG. 1 to FIG. 3 into account, it is possible to take a favorable balance not only between an addition quantity and the lightweight characteristics and the moldability of the lightweight clay but also between an addition quantity and the manufacturing cost rate. Further, it is also appreciated that by setting an addition quantity of the organic hollow micro spheres to a value, which falls within a range of 1 to less than 3 weight %, it is possible to take a more excellent balance with respect to these characteristics.

(7) Bulk Density

Further, it is preferable to set the bulk density of the organic hollow micro spheres to a value, which falls within a range of about 0.001 to 0.5 g/cm$^3$.

The reason is that when the bulk density of the organic hollow micro spheres assumes a value less than 0.001 g/cm$^3$, there is a possibility that the uniform mixing and dispersion of the organic hollow micro spheres into the lightweight clay becomes difficult. On the other hand, when the bulk density of the organic hollow micro spheres exceeds 0.5 g/cm$^3$, there is a possibility that the malleability of the lightweight clay is lowered or the lightweighting becomes difficult.

Accordingly, it is more preferable to set the bulk density of the organic hollow micro spheres to a value which falls within a range of about 0.005 to 0.2 g/cm$^3$ and it is further preferable to set the bulk density of the organic hollow micro spheres to a value which falls within a range of about 0.01 to 0.1 g/cm$^3$.

Here, the bulk density of the organic hollow micro spheres can be measured in accordance with JIS K 5101 (pigment testing method).

(8) pH Value

Further, it is preferable to set the pH value of the organic hollow micro spheres to a value, which falls within a range of about 3 to 11.

The reason is that when the pH value of the organic hollow micro spheres assumes a value less than 3, it is necessary to add a hydroxyl group containing compound or a carboxyl group containing compound and, at the same time, there is a possibility that the organic hollow micro spheres are gelled when they are stored for a long period. On the other hand, when the pH value of the organic hollow micro spheres exceeds a value of 11, there is a possibility that the mixing and dispersion as well as the handling of the organic hollow micro spheres become difficult.

Accordingly, it is more preferable to set the pH value of the organic hollow micro spheres to a value which falls within a range of about 6 to 10.5 and it is further preferable to set the pH value of the organic hollow micro spheres to a value which falls within a range covering neutral and weak alkaline, that is, about 7 to 10.5.

(9) Surface Treatment

Further, it is preferable to apply the surface treatment to peripheries of the organic hollow micro spheres using the fluorescent whitening agent, which will be explained later.

The reason is that even when the whiteness degree (WL) of the organic hollow micro spheres is low, it is possible to easily adjust an L value of the lightweight clay within a desired range using a relatively small quantity of fluorescent whitening agent.

Further, it is also preferable to apply the surface treatment to peripheries of the organic hollow micro spheres using white particles. The reason is that by adding the white particles of oxide titanium, silica, alumina, tin oxide, zinc oxide, zinc sulfide, antimony oxide or the like to the organic hollow micro spheres, the adjustment of the L value of the organic hollow micro spheres is facilitated and the dispersion characteristics and the mechanical characteristics can be improved.

Further, it is also preferable to apply the surface treatment to the peripheries of the organic hollow micro spheres using a silane coupling agent, a titanium coupling agent, an aluminum coupling agent or the like. The reason is that by performing the coupling agent treatment in such a manner, the dispersing characteristics and the mechanical characteristics of the organic hollow micro spheres can be remarkably enhanced.

Here, when the fluorescent whitening agent is used in performing such a surface treatment, it is preferable to set an addition quantity of the fluorescent agent to a value, which falls within a range of about 0.01 to 1 weight % with respect to a total quantity of the lightweight clay. Further, in the same manner, when the white particles are used, it is preferable to set an addition quantity of the white particles to a value, which falls within a range of about 0.1 to 10 weight % with respect to a total quantity of the lightweight clay. Still further, in the same manner, when the coupling agent treatment is applied, it is preferable to set an addition quantity of the coupling agent to a value which falls within a range of about 0.05 to 5 weight % with respect to a total quantity of the lightweight clay.

2. Polar Compound (1) Type

The polar material, which constitutes the binder resin, is preferably a hydroxyl group containing compound or a carboxyl group containing compound, for example.

Here, although there exists a compound such as polyacrylic acid or polyvinyl alcohol, which contains both of the hydroxyl group and the carboxyl group in molecules, the polar materials are explained hereinafter by classifying them into either one type.

i) Hydroxyl Group Containing Compound

As the hydroxyl group containing compound, polyvinyl alcohol, polyvinylformal, polyvinyl butyral, polyethylene vinylacetate, urea resins, methylcellulose, ethyl cellulose, hydroxyethylcellulose or the like is named.

By adding such a hydroxyl group containing compound, it is possible to easily adjust the malleability and creep resistance and the like of the lightweight clay. Further, these hydroxyl group containing compounds are usually water-soluble and hence, it is possible to obtain the excellent compatibility even when water is added to the lightweight clay.

Particularly, the polyvinyl alcohol includes a large quantity of hydroxyl group per a unit weight and hence, it is possible to effectively enhance the malleability and the handling characteristics of the lightweight clay by adding a relatively small quantity of polyvinyl alcohol. Accordingly, the polyvinyl alcohol constitutes a more preferable hydroxyl group containing compound.

Further, polyvinylformal and polyvinyl butyral are resins, which are formed by respectively acetalizing polyvinyl alcohol with formaldehyde and butyraldehyde. The use of polyvinylformal and polyvinyl butyral is effective to obtain the more excellent creep resistance and heat resistance in the lightweight clay.

Still further, although polyvinyl acetate is a raw material before saponifying polyvinyl alcohol, polyvinyl acetate is a hydroxyl group containing compound, which is effective in obtaining the lightweight clay, which exhibits more excellent malleability.

ii) Carboxyl Group Containing Compound

As carboxyl group containing compound, carboxymethylcellulose (CMC), acrylic acid, polyvinyl acetate or the like is named.

Here, when carboxymethylcellulose is used as the carboxyl group containing compound, it is preferable to use carboxymethylcellulose having the degree of etherification, which falls within a range of about 0.1 to 2.

The reason is that when the degree of etherification of carboxymethylcellulose is less than 0.1, the lightweight clay becomes sticky and hence, there arises a case that the handling of the lightweight clay becomes difficult. On the other hand, when the degree of etherification of carboxymethylcellulose exceeds 2, the malleability of the lightweight clay is lowered and hence, it is difficult to form the lightweight clay into a thin film.

(2) Addition Quantity

Further, it is preferable that an addition quantity of the polar compound assumes a value which falls within a range of about 0.1 to 30 weight % with respect to a total quantity (100 weight %) of the lightweight clay.

The reason is that when an addition quantity of the polar compound assumes a value less than 0.1 weight %, there may be a case that the handling characteristics and the moldability of the lightweight clay is remarkably lowered. On the other hand, when an addition quantity of the polar compound assumes a value, which exceeds 30 weight %, there may be a case that the malleability of the lightweight clay is reduced and, at the same time, the mixing and dispersion of the polar compound become difficult.

Accordingly, to take a more preferable balance between the handling characteristics and the moldability of the lightweight clay and the malleability of the lightweight clay, it is preferable to set an addition quantity of the polar compound to a value which falls within a range of about 0.5 to 20 weight % with respect to a total quantity (100 weight %) of the lightweight clay. It is more preferable to set an addition quantity of the polar compound to a value, which falls within a range of about 1 to 15 weight % with respect to a total quantity of the lightweight clay. It is still more preferable to set an addition quantity of the polar compound to a value, which falls within a range of about 2 to 10 weight % with respect to a total quantity of the lightweight clay, for example.

3. Fiber (1) Type

The type of fiber (pulp), which constitutes an additive, are not limited specifically. It is preferable to use fibers, which are respectively made of wide-leaved tree and conifer as raw material, for example.

However, it is more preferable to use fibers made of wide-leaved tree as raw material. The reason is that the fibers which use wide-leaved tree as raw material usually have a shorter fiber length and is more uniform than the fiber which uses conifer as raw material and hence, the fiber which uses wide-leaved tree can be dispersed more easily at the time of forming the lightweight clay.

(2) Average Fiber Length

Further, it is preferable to set an average fiber length of the fibers to a value, which falls within a range of about 0.01 to 20 mm.

The reason is that when the average fiber length of the fibers assumes a value less than 0.01 mm, there may be a case that the malleability of the lightweight clay is lowered or the lightweighting becomes difficult. On the other hand, when the average fiber length of the fibers exceeds 20 mm, there may be a case that it is difficult to uniformly mix and disperse the fibers in the inside of the lightweight clay.

Accordingly, to take a more favorable balance between the malleability or the like of the lightweight clay and the mixing and dispersing characteristics, it is more preferable to set the average fiber length of the fibers to a value, which falls within a range of about 0.1 to 10 mm. It is further more preferable to set the average fiber length of the fibers to a value, which falls within a range of about 0.5 to 5 mm.

(3) Addition Quantity

It is preferable to determine an addition quantity of the fibers by taking the handling characteristics and the moldability of the lightweight clay or the easiness of manufacturing of the lightweight clay into account. For example, it is preferable to set an addition quantity of fibers to a value, which falls within a range of 1 to less than 10 weight % with respect to a total quantity, for example.

The reason is that when an addition quantity of the fibers assumes a value less than 1 weight %, there may be a case that an advantageous effect brought about by the addition of the fibers cannot be realized. On the other hand, when an addition quantity of the fibers assumes a value not less than 10 weight %, there may be a case that the control of malleability of the lightweight clay and the manufacturing of the lightweight clay becomes difficult.

Accordingly, it is more preferable to set an addition quantity of the fibers to a value which falls within a range of about 2 to 9 weight % with respect to a total quantity of the lightweight clay, and it is further more preferable to set an addition quantity of the fibers to a value which falls within a range of about 3 to 8 weight % with respect to a total quantity of the lightweight clay.

4. Water

It is preferable to determine an addition quantity of water by taking the handling characteristics, the moldability of the lightweight clay or the easiness of manufacturing of the lightweight clay into account. For example, it is preferable to set an addition quantity of water to a value within a range of about 61 to 85 weight % with respect to a total quantity of the lightweight clay.

The reason is that when an addition quantity of water assumes less than 61 weight %, there may be a case that an expected advantageous effect is not achieved and hence, the adjustment of the lightweight clay becomes difficult. On the other hand, when an addition quantity of water exceeds 85 weight %, there may be a case that the control of malleability and creep resistance of the lightweight clay becomes difficult.

Accordingly, it is more preferable to set an addition quantity of water to a value within 65 to 83 weight % with respect to a total quantity of the lightweight clay, and it is further more preferable to set an addition quantity of water to a value within about 67 to 80 weight % with respect to a total quantity of the lightweight clay.

5. Color Elements (1) Type

Although the type of color elements is not limited, any color elements, which have been used in the fields of inks and painting conventionally, can be used. For example, organic pigments, inorganic pigments or dyes are named.

As the organic pigments, a group of azo pigments including azo rake, insoluble azo pigments, disazo condensation pigments, chelate azo pigments and the like, a group of polycyclic pigments including phthalcyanine pigments, perylene pigments, pellion pigments, anthraquinone pigments, quinacridone pigments, dioxazine pigments, thio-indigo pigments, iso-indolinone pigments, quinophthalone pigments and the like, dye rake and the like are named.

Further, as inorganic pigments, for example, oxides including titanium oxide, red iron oxide, chromium oxide, black carbon oxide, cadmium yellow, chromium vermilion, Milori blue, ultramarine blue, carbon black, yellow iron oxide, pearl pigment and the like are named.

Still further, when sharper tones are required, it is also preferable to use plastic type organic pigments which mainly contain folmalin condensation resin, acrylic resin, guanamine resin or the like, or inorganic pigments which are produced by sintering zinc sulfide, zinc silicate, zinc sulfide cadmium or the like.

(2) Average Particle Size

Further, it is preferable to set an average particle size of the color elements to a value, which falls within a range of about 0.01 to 0.2 $\mu$m.

The reason is that when an average particle size of the color elements assumes a value, which is less than 0.01 $\mu$m, the color elements are liable to be remarkably flocculated and hence, it is difficult to uniformly mix and disperse the color elements in the lightweight clay thus lowering the coloring characteristics of the lightweight clay. On the other hand, when an average particle size of the color elements exceeds 0.2 $\mu$m, a synergistic effect with the organic hollow micro spheres cannot be achieved and hence, the coloring characteristics of the lightweight clay are lowered.

Accordingly, to achieve a more favorable balance between the flocculation and the coloring characteristics of the color elements, it is more preferable to set an average particle size of the color elements to a value which falls within a range of about 0.06 to 0.18 $\mu$m, and it is further more preferable to set an average particle size of the color elements to a value which falls within a range of about 0.07 to 0.12 $\mu$m.

Here, it is found that the smaller the particle size of the color pigments, the surface activity is increased and hence, the color pigments are liable to be easily stuck to the peripheries of hollow micro spheres having a large average particle size. However, as will be explained in detail hereinafter, it is found that according to the lightweight clay of the present invention, even when the color pigments stick to the peripheries of the hollow micro spheres and covers such peripheries, an amount of external light obstructed by the color pigments can be reduced compared to the conventional lightweight clay.

Here, the relationship between the average particle size of the color pigments and the optical transmissivity, that is, the coloring characteristics is explained in detail in conjunction with FIGS. 6(a) and (b).

FIG. 6(a) is a schematic view showing the relationship among color pigments 10, an organic hollow micro sphere 12 and external lights 14, 16 according to the lightweight clay of the present invention. Further, FIG. 6(b) is a schematic view showing the relationship among color pigments 20, an organic hollow micro sphere 22 and external lights 24, 26 according to a conventional lightweight clay.

As can be understood from FIG. 6(a), according to the lightweight clay of the present invention, the average particle size of the color pigment 10 is preferably set to a value which is less than ½ of a wavelength of light and the standard deviation of the particle size distribution is further adjusted to a value which falls within a given range. Accordingly, even when the color pigments 10 stick to the hollow micro sphere 12 and covers a periphery thereof, the external lights 14, 16 are less obstructed by the color pigments 10.

On the other hand, in FIG. 6(b), since the average particle size of the color pigment 20 is equal to or larger than the wavelength of light, when the color pigments 20 stick to the organic hollow micro sphere 22 and cover a periphery thereof, there arises a case that the color pigments 20 obstruct the transmission of the external lights 14, 16.

Accordingly, in the lightweight clay of the present invention, by preferably combining the specified organic hollow micro sphere 12 and the color pigments 10 having the specified average particle size or the like, it is possible to effectively prevent scattering of light in the organic hollow micro sphere 12 so as to obtain the coloring characteristics having sharpness and transparency.

(3) Particle Size Distribution 1

Further, it is preferable to set the standard deviation to a value of not more than 0.05 $\mu$m with respect to the particle size distribution of the color elements.

The reason is that when the standard deviation of the particle size distribution of the color elements exceeds 0.05 $\mu$m, there may be a case that scattering of light is increased or color elements are remarkably flocculated so that the coloring characteristics attributed to the color elements are lowered.

However, when the standard deviation of particle size distribution of the color elements becomes excessively small, there may be a case that the manufacturing cost of the lightweight clay is pushed up due to the control of the particle size distribution of the color elements.

Accordingly, to enhance the balance between the coloring characteristics due to the color elements and the manufacturing cost, it is more preferable to set the standard deviation of particle size distribution of the color elements to a value, which falls within a range of about 0.04 to 0.01 $\mu$m. It is further more preferable to set the standard deviation of particle size distribution of the color elements to a value, which falls within a range of about 0.03 to 0.01 $\mu$m.

Here, the standard deviation of the particle size distribution of the color elements can be measured using a laser-type particle counter, for example.

(4) Particle Size Distribution 2

Further, it is preferable that 95% of the particle sizes of the color elements falls within a range of ±10% of the average particle size.

The reason is that it is possible to obtain the lightweight clay, which is excellent in both of coloring characteristics and moldability with the use of color elements having such a narrow particle size distribution. In other words, when 95% of the particle sizes of the color elements exceeds ±10% of the average particle size, there may be a case that the color elements are liable to be flocculated and it is difficult to obtain a synergistic effect with the organic hollow micro spheres. Accordingly, when the particle size distribution of the color elements is broadened, there may be a case that the coloring characteristics are lowered due to the color elements.

In view of the above, to obtain the more excellent coloring characteristics due to color elements, it is more preferable that 95% of the particle sizes of the color elements falls within a range of ±8% of the average particle size. It is further more preferable that 95% of the particle sizes of the color elements falls within a range of ±5% of the average particle size.

Here, the particle size distribution of 95% of the average particle size of color elements can be measured using a laser-type particle counter, for example.

(5) Addition Quantity

Further, it is preferable to set an addition quantity of color elements to a value, which falls within a range of about 0.01 to 10 weight % with respect to a total quantity of the lightweight clay.

The reason is that when an addition quantity of the color elements is less than 0.01 weight %, an addition effect and a synergistic effect with the organic hollow micro spheres cannot be achieved and hence, there may be a case that the coloring characteristics due to the color elements is lowered. On the other hand, when an addition quantity of the color elements exceeds 10 weight %, there may be a case that scattering of light is increased or the color elements are liable to be remarkably flocculated and hence, the coloring characteristics are lowered in a reverse way.

Accordingly, to achieve the more favorable coloring characteristics due to the color elements, it is more preferable to set an addition quantity of color elements to a value, which falls within a range of about 0.05 to 8 weight %. It is further more preferable to set an addition quantity of color elements to a value, which falls within a range of about 0.1 to 5 weight %.

Here, the relationship between an addition quantity of color pigments and the coloring characteristics is explained in detail in conjunction with FIG. 7(a) and FIG. 7(b).

FIG. 7(a) is a schematic view showing the relationship among the color pigments 10, the organic hollow micro spheres 12, external lights 14, 16 with respect to the lightweight clay of the present invention. Further, FIG. 7(b) is a schematic view showing the relationship among the color pigments 10, the organic hollow micro spheres 12, external lights 30, 32 when an addition quantity of the color pigments 10 used in the lightweight clay of the present invention is excessive.

As can be understood from FIG. 7(a), in the lightweight clay of the present invention, even when the color pigments 10 are stuck to a periphery of the organic hollow micro sphere 12, an addition quantity of the color pigments 10 is set to a value which allows the color pigments 10 partially cover the periphery of the organic hollow micro sphere 12 and hence, external lights 30, 32 are less interrupted.

On the other hand, in FIG. 7(b), an addition quantity of the color pigments 10 exceeds a given range and hence, the color pigments 10 are densely stuck to a periphery of the organic hollow micro sphere 12 and are, sometimes, stuck to the periphery of the organic hollow micro sphere 12 in two layers whereby there arises a case that transmission of external lights 30, 32 is interrupted.

Accordingly, in the lightweight clay of the present invention, by preferably combining the specified organic hollow micro sphere 12 and a specified quantity of the color pigments 10, it is possible to effectively prevent scattering of light in the organic hollow micro sphere 12 so as to obtain the coloring characteristics having sharpness and transparency.

(6) Water-Dispersing Characteristics

Further, it is preferable that color elements have water-dispersing characteristics (containing alcohol dispersing characteristics), that is, hydrophilic.

The reason is that with the use of the such specific color elements, even when the lightweight clay includes water or alcohol, the color elements are not flocculated and hence, it is possible to obtain the excellent coloring characteristics and the excellent moldability. Further, provided that the color elements have the water-dispersing characteristics, even when the color elements are micro particles, it is possible to preserve the color elements in water and to blend the color elements while holding the preserving state of the solution.

Further, to impart the water dispersing characteristics to the color elements, it is preferable to set an acid value of a resin, which constitutes color elements to a value, which falls within a range of about 50 to 300.

The reason is that when the acid value of the resin is a value less than 50, there may be a case that the water-dispersing characteristics of the obtained pigments can be remarkably reduced. On the other hand, when the acid value of the resin exceeds 300, there may by a case that the obtained color elements are liable to be flocculated. Accordingly, to enhance the balance between the water dispersing characteristics and the flocculation of the obtained color elements, it is more preferable to set the acid value of resin which constitutes the color elements to a value which falls within a range of about 70 to 250, and it is further more preferable to set an acid value of resin which constitutes the color elements to a value which falls within a range of about 90 to 200.

Here, to control an oxidation value to an above-mentioned range, it is preferable that the resin, which constitutes the color elements, includes a hydrophilic group such as a carboxyl group, a sulfonic acid group, and a hydroxyl acid group in molecules. That is, it is preferable to use styrene-maleic acid copolymer resin, styrene-sulfonic acid copolymer resin, styrene-acrylic acid copolymer resin and the like as resin constituting the color elements.

Further, to impart the water dispersing characteristics to the color elements, it is preferable for the color elements to adopt an emulsion containing a surfactant such as an anionic system surfactant, a nonion system surfactant or the like as a mode thereof.

As such a surfactant, for example, sodium dodecyl benzene sulfonate, sodium lauryl sulfate, ammonium salt of polyoxyethylene alkyl ether sulfate, polyoxyethylene alkyl ether, polyoxyethylene alkyl ester, polyoxyethylene sorbitan fatty acid ester, polyoxyethylene alkyl phenyl ether, polyoxyethelene alkyl amine, polyoxyethylene alkyl amide, and one, two or more kinds of acetylated compounds of these materials or the like are named.

6. Fluorescent Whitening Agent (1) Type

As the fluorescent whitening agent added to the lightweight clay, for example, stilbene compound, stilbene derivatives, sulfonic acid stilbene compound, thiophene compound, thiophene derivatives and the like are named.

Particularly, sulfonic acid stilbene compounds which are expressed by following chemical structural formulae (1) to (3) are anionic and water-soluble and can ensure not only the easy handling but also the acquisition of the excellent fluorescent whitening effect even when a small quantity of such compound is added. Accordingly, sulfonic acid stilbene compounds are preferable fluorescent whitening agents.

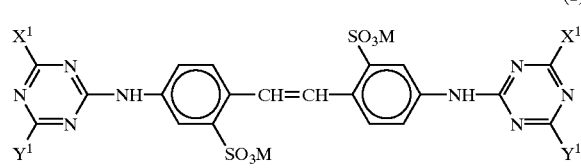

(1)

[In the formula (1), a symbol M indicates hydrogen, alkaline metal, and either one of cations expressed by ammonium ion and amine ion, X and Y indicate substituents which are independent from each other and are either one of substituents expressed by $NH_2$, $N(C_2H_4OH)_2$, $N(CH_2CH(OH)CH_3)_2$ or $NR^1R^2$ ($R^1$ and $R^2$ being hydrocarbon group having hydrogen number or carbon number of 1 to 20)]

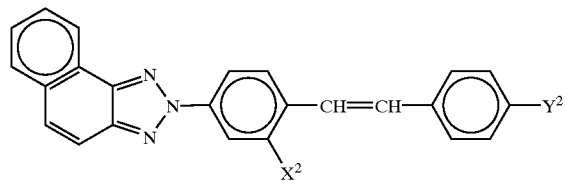

(2)

[In the formula (2), symbols X and Y indicate substituents which are independent from each other and are either one of substituents expressed by $SO_2M$ (a symbol M indicates hydrogen, alkaline metal, ammonium, and any one of cations expressed by amine ion), NH2, $N(C_2H_4OH)_2$, $N(CH_2CH(OH)CH_3)_2$ or $NR^1R^2$ ($R^1$ and $R^2$ being hydrocarbon group having hydrogen number or carbon number of 1 to 20)]

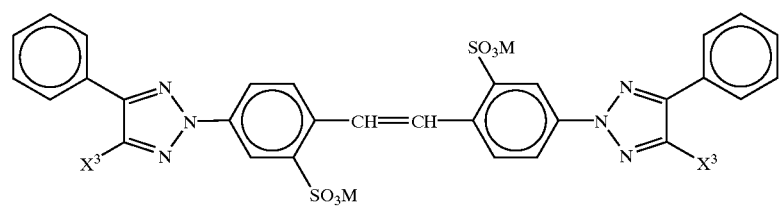

(3)

[In the formula (3), symbols X indicates any one of substituents expressed by $NH_2$, $N(C_2H_4OH)_2$, $N(CH_2CH(OH)CH_3)_2$ or $NR^1R^2$ ($R^1$ and $R^2$ being hydrocarbon group having hydrogen number or carbon number of 1 to 20)]

(2) Density

Further, it is preferable to set the density of the fluorescent whitening agent to a value, which falls within a range of 0.9 to 2.0 g/cm³ (measuring temperature: 20 degree centigrade, this measuring temperature being applicable hereinafter).

The reason is that when the density of the fluorescent whitening agent assumes a value outside such a range, there may be a case that it is difficult to uniformly mix the fluorescent whitening material into the lightweight clay. Accordingly, it is more preferable to set the density of the fluorescent whitening agent to a value, which falls within a range of 1.0 to 1.6 g/cm³. It is further more preferable to set the density of the fluorescent whitening agent to a value, which falls within a range of 1.1 to 1.4 g/cm³.

(3) Viscosity

Further, it is preferable to set the viscosity of the fluorescent whitening agent to a value, which falls within a range of 5 to 1000 mPa·s (measuring temperature: 20 degree centigrade, this measuring temperature being applicable hereinafter).

The reason is that when the viscosity of the fluorescent whitening agent assumes a value below 5 mPa·s, there may be a case in which it is difficult to mix the fluorescent whitening agent to the lightweight clay. On the other hand, when the viscosity of the fluorescent whitening agent exceeds 1000 mPa·s, there may be a case in which the fluorescent whitening agent is flocculated so that it is difficult to handle the lightweight clay and, at the same time, it is difficult to uniformly mix the fluorescent whitening agent into the lightweight clay.

Accordingly, it is more preferable to set the viscosity of the fluorescent whitening agent to a value, which falls within a range of about 10 to 500 mPa·s, and it is further more preferable to set the viscosity of the fluorescent whitening agent to a value, which falls within a range of about 30 to 200 mPa·s.

(4) pH

Further, it is preferable to set the pH of the fluorescent whitening agent to a value, which falls within a range of about 7.1 to 10.

The reason is that when the pH of the fluorescent whitening agent assumes a value less than 7.1, there may be a case in which the lightweight clay is excessively gelled so that the lightweight clay exhibits the poor storing stability. On the other hand, when the pH of the fluorescent whitening agent exceeds 10, there may be a case in which it is difficult to handle the lightweight clay.

Accordingly, it is more preferable to set the pH of the fluorescent whitening agent to a value, which falls within a range of about 7.5 to 9.5, and it is further more preferable to set the pH of the fluorescent whitening agent to a value, which falls within a range of about 8 to 9.

(5) Addition Quantity

It is preferable to set an addition quantity of the fluorescent whitening agent to a value, which falls within a range of about 0.001 to 5 weight % with respect to a total quantity of the lightweight clay.

The reason is that when an addition quantity of the fluorescent whitening agent is less than 0.001 weight %, an addition effect cannot be achieved and hence, there may be a case that the adjustment of the L value of the lightweight clay becomes difficult. On the other hand, when an addition quantity of fluorescent whitening agent exceeds 5 weight %, there may be a case that the L value of the lightweight clay is saturated and, at the same time, the fluorescent whitening agent bleeds to the outside.

Accordingly, it is more preferable to set an addition quantity of the fluorescent whitening agent to a value, which falls within a range of about 0.01 to 3 weight % with respect to a total quantity of the lightweight clay. It is further more preferable to set an addition quantity of the fluorescent whitening agent to a value, which falls within a range of about 0.05 to 1 weight % with respect to a total quantity of the lightweight clay.

Further, it is preferable to determine an addition quantity of the fluorescent whitening agent using the organic hollow micro spheres as the reference. That is, assuming an addition quantity of the organic hollow micro spheres as F1 and an addition quantity of the fluorescent whitening agent as F2, it is preferable to set a value of F1/F2 to a value, which falls within a range of about 1 to 100.

The reason is that when the value of F1/F2 assumes a value less than 1, there may be a case that the L value of the lightweight clay is saturated and, at the same time, the lightweighting of the lightweight clay becomes difficult. On the other hand, when the value of F1/F2 exceeds 100, there may be a case that the adjustment of the L value of the lightweight clay becomes difficult.

Accordingly, it is more preferable to set a value of F1/F2 to a value, which falls within a range of about 2 to 50. It is further more preferable to set a value of F1/F2 to a value, which falls within a range of about 5 to 30.

7. Gelling Agent (1) Type

Further, it is preferable to add a gelling agent to a main component such as polyvinyl alcohol. This is because that it is possible to remarkably enhance the handling and moldability of the lightweight clay by adding such a gelling agent.

As such a gelling agent, a single type or a combination of two or more selected from a group consisting of boric acid, borax, Congo red, resorcinol, catechol, phloroglucinol, gallic acid, chromic acid (3 valences), bichromic acid, titanic acid, vanadic acid and the like are named. Among these materials, boronic acid and borax are preferable gelling agents since they ensure the easy control of gelling of the polyvinyl alcohol particularly.

(2) Addition Quantity

Further, although it is preferable to determine an addition quantity of the gelling agent by taking the handling characteristics and the moldability of the lightweight clay, it is preferable to set an addition quantity of the gelling agent to a value which falls within a range of about 0.01 to 10 parts by weight with respect to 100 parts by weight of polyvinyl alcohol.

The reason is that when an addition quantity of the gelling agent assumes a value less than 0.01 parts by weight, there may be a case that an addition effect cannot be achieved. On the other hand, when an addition quantity of the gelling agent exceeds 10 parts by weight, there may be a case that it is difficult to control the gelling of the polyvinyl alcohol of the lightweight clay.

Accordingly, it is more preferable to set an addition quantity of the gelling agent to a value which falls within a range of about 0.05 to 5 parts by weight and it is further more preferable to set an addition quantity of the gelling agent to a value which falls within a range of about 0.1 to 1 parts by weight with respect to 100 parts by weight of polyvinyl alcohol.

8. Fillers (1) Type

Further, it is preferable to add organic fillers or inorganic fillers into the lightweight clay. The reason is that by adding such a filler to the lightweight clay, it is possible to obtain the lightweight clay, which can exhibit the further excellent moldability, the further excellent lightweight characteristics and the further excellent degree of whiteness.

As such fillers, for example, polymethylmethacrylate, polyether acrylate, polystyrene, styrene-acrylic nitrile copolymers, a styrene-vinyl-acetate copolymers, polyvinyl acetate, ethylene-polyvinyl acetate copolymer, ethylene-acrylic acid copolymers, polypropylene, polyvinylidene chloride, vinylidene chloride-acrylic nitrile copolymers, phenol resins, guanamine resins, urea resins, calcium carbonate, talc, titanium oxide, silica, mica, zirconium, alumina, chromium oxide, tin oxide, lead oxide, indium oxide, carbon, glass, aramid fibers and the like are named.

Particularly, since talc is inexpensive and can be easily handled due to a proper average particle size thereof, talc is a suitable filler for adjusting the moldability and the lightweight characteristics of the lightweight clay.

(2) Addition Quantity

Further, in adding the fillers, assuming a total quantity of lightweight clay as 100%, it is preferable to set an addition quantity of the fillers to a value, which falls within a range of about 0.1 to 20 weight %.

The reason is that when an addition quantity of the filler is less than 0.1 weight %, there may be a case that an addition effect cannot be obtained. On the other hand, when an addition quantity of the fillers is not less than 20 weight %, there may be a case that the moldability and the lightweight characteristics of the lightweight clay are lowered in a reverse manner.

Accordingly, assuming a total quantity of lightweight clay as 100%, it is more preferable to set an addition quantity of the fillers to a value, which falls within a range of about 0.5 to 15 weight %. It is further more preferable to set an addition quantity of the fillers to a value, which falls within a range of about 1 to 10 weight %.

9. Whiteness Degree (1) Whiteness Degree (WL)

Further, this embodiment is characterized in that the whiteness degree (WL) of the lightweight clay, which is measured in accordance with JIS L 0803, is set to a value which is equal to or more than 50.

The reason is that when the whiteness degree (WL) of the lightweight clay measured in accordance with JIS L 0803 assumes a value less than 50, an aesthetic appearance is lowered and, when color elements are added, they are mixed non-uniformly thus remarkably lowering the coloring characteristics. However, when the value of whiteness degree (WL) is excessively high, there may be a case that types of constitutional materials, which can be used as the lightweight clay, are excessively restricted.

Accordingly, it is preferable to set the whiteness value (WL) of the organic hollow micro spheres to a value within a range of about 70 to 99.9. It is more preferable to set the whiteness value (WL) of the organic hollow micro spheres to a value within a range of about 80 to 99.

Here, the relationship between the whiteness degree (WL) of the lightweight clay and a result of evaluation of the coloring characteristics is explained in conjunction with the characteristic graphs shown in FIG. 4 and FIG. 5. In FIG. 4, a value of whiteness degree (WL) of the lightweight clay is taken on an axis of abscissas and the evaluation result (relative value) of the coloring characteristics is taken on an axis of ordinates. Further, a characteristic curve indicated by a black circular dot indicates a case in which 0.02 weight % of blue color elements is added and a characteristic curve indicated by a black triangular dot indicates a case in which 0.1 weight % of yellow color elements is added. Here, the evaluation result of the coloring characteristics is expressed as numerical values such that the evaluation "very good" in the embodiment 1 is given an evaluation point 5, the evaluation "good" in the embodiment 1 is given an evaluation point 4, the evaluation "fair" in the embodiment 1 is given an evaluation point 2, the evaluation "bad" in the embodiment 1 is given an evaluation point 1 and the evaluation "very bad" in the embodiment 1 is given an evaluation point 0.

It is understood from the characteristic curves shown in FIG. 4 that in the respective lightweight clays to which the blue color elements and the yellow color elements are added, the higher the whiteness degree (WL), there is a tendency that the evaluation point of the coloring characteristics in increased. Particularly, it is understood that when the whiteness degree (WL) is not less than 50, the favorable evaluation point is obtained.

In FIG. 5, an addition quantity of the fluorescent whitening agent (weight %) of the lightweight clay is taken on an axis of abscissas and an evaluation result (relative value) of the coloring characteristics when 0.02 weight % of blue color elements are added is taken on an axis of ordinates. Further, a characteristic curve indicated by a black circular dot indicates a case in which the whiteness degree (WL) of the lightweight clay is not less than 50 (WL=60) and a characteristic curve indicated by a black triangular dot indicates a case in which the whiteness degree (WL) of the lightweight clay is less than 50 (WL=0). As can be understood from the result shown in FIG. 5, when the whiteness degree (WL) of the lightweight clay is not less than 50, it is possible to obtain the evaluation point of 3 or more by adding approximately 0.05 to 0.1 weight % of fluorescent whitening agent. To the contrary, when the whiteness degree (WL) of the lightweight clay is less than 50, even when 0.3 to 0.5 weight % of fluorescent whitening agent is added, the evaluation point remains low, that is, the evaluation point is held at not more than 1.

Accordingly, it is appreciated that by setting the whiteness degree (WL) of the lightweight clay to a value not less than 50, it is possible to obtain the excellent coloring characteristics even when a small quantity of fluorescent whitening agent is added.

(2) Whiteness Degree (WB), Whiteness Degree (WH), Visual Lightness (L Value)

As indices of whiteness degree which is analogous to the whiteness degree (WL) measured in accordance with JIS L 0803, whiteness degree (WB) based on the blue reflectance, whiteness degree (WH) based on the Hunter method and visual lightness (L value) are named.

These whiteness degrees are values, which are measured independently from the measurement of the whiteness degree (WL) measured in accordance with JIS L 0803. In expressing the whiteness of the lightweight clay using these whiteness degrees, for example, when the whiteness of the lightweight clay is expressed using the whiteness degree (WB) based on blue reflectance, it is preferable to set the whiteness degree (WB) to a value which falls within a range of 60 to 95, for example. In the same manner, when the whiteness of the lightweight clay is expressed using the whiteness degree (WH) based on the Hunter method, it is preferable to set the whiteness degree (WH) to a value, which falls within a range of 70 to 98. Further, when the whiteness of the lightweight clay is expressed using the visual lightness (L value), it is preferable to set the visual lightness (L value) to a value, which falls within a range of 80 to 99.

10. Other Additives

As additives other than the above-mentioned additives, it is preferable to add one type only or a combination of two or more types of additives selected from a group consisting of an anti-mildew agent, an antimicrobial agent, an oxidation prevention agent, an ultraviolet ray absorption agent, oils, waxes, glycerol, a thickener, a plasticizer, a surfactant, an organic solvent and the like to the lightweight clay.

11. Manufacturing Method (1) Mixing Step

This step is a step in which blending materials such as the organic hollow micro spheres, color elements, polar compounds, fibers, water and the like are uniformly mixed. For example, to enable the uniform mixing and dispersion of blending raw materials, it is preferable to use a propeller mixer, a kneader, a planetary mixer, a triple roller, a ball mill or the like.

Particularly, since the organic hollow micro spheres are light in weight, are liable to be broken down during mixing and, at the same time, are liable to generate irregularities in dispersion, it is preferable to extrude and mix the organic hollow micro spheres using the kneader under conditions of a rotational speed of 10 to 1000 rpm and an operation time of 1 to 60 minutes. It is more preferable to extrude and mix the organic hollow micro spheres under conditions of a rotational speed of 30 to 300 rpm and an operation time of 10 to 30 minutes.

Further, also with respect to the color elements, to ensure the uniform mixing and dispersion, it is preferable to prepare the color elements in a solution form by dispersing the color elements in water or alcohol and to adjust a value of pH thereof to not less than 7 by adding an alkaline agent or the like. That is, it is preferable to adjust the pH of the color elements to a value within a range of 8 to 10. It is more preferable to adjust the pH of the color elements to a value within a range of 8.5 to 10.

Further, in mixing the blending material, it is preferable to maintain the temperature within a range of 30 to 70 degree centigrade, for example.

The reason is that when the mixing temperature is less than 30 degree centigrade, there may be a case that the blending materials are not mixed uniformly, while on the other hand, when the mixing temperature exceeds 70 degree centigrade, there may be a case that the obtained lightweight clay loses elongation and becomes fragile.

Accordingly, it is preferable to maintain the mixing temperature at a temperature, which falls within a range of 35 to 60 degree centigrade at the time of mixing the blending materials. It is more preferable to maintain such a mixing temperature at a temperature, which falls within a range of 40 to 55 degree centigrade.

(2) Viscosity Adjusting Step

Further, this step is a step for adjusting the viscosity of the lightweight clay. It is preferable to set the viscosity of the lightweight clay to a value, which falls within a range of $1 \times 10^3$ to $1 \times 10^9$ mPa·s (measuring temperature: 25 degree centigrade, the same measuring temperature being applicable hereinafter), for example, by adding water, alcohol or an organic solvent.

The reason is that when the viscosity of the lightweight clay assumes a value less than $1 \times 10^3$ mPa·s, there may be a case that a surface of the lightweight clay becomes largely sticky and hence, the handling characteristics are lowered. On the other hand, when the viscosity of the lightweight clay exceeds $1 \times 10^9$ mPa·s, there may be a case that the obtained lightweight clay loses the elongation and becomes fragile and the handling characteristics of the lightweight clay are lowered to the contrary.

Accordingly, it is more preferable to set the viscosity of the lightweight clay to a value which falls within a range of $1 \times 10^4$ to $1 \times 10^8$ mPa·s and it is further more preferable to set the viscosity of the lightweight clay to a value which falls within a range of $1 \times 10^5$ to $1 \times 10^7$ mPa·s.

(3) Packaging Step

It is preferable to provide a step, which divides the produced lightweight clay, and packages divided clays into small packages. That is, the lightweight clay usually contains a large quantity of water, alcohol or the like. Accordingly, to ensure the handling characteristics while maintaining a water content in the lightweight clay, it is preferable to package the lightweight clay using a moisture-proof material, for example, a plastic material such as polyethylene or polypropylene.

However, to reduce the swelling problem attributed to degassing of un-expanding organic hollow micro spheres, it is preferable to form vent holes in a packaging material or constitute a packaging material using a gas permeable material.

In this case, to take a balance between the maintenance of a water content of the lightweight clay and the reduction of the swelling problem, it is preferable to set a size of the vent holes to a value within a range of 0.01 to 100 μm. It is more preferable to set a size of the vent holes to a value within a range of 0.05 to 50 μm. It is further more preferable to set a size of the vent holes to a value within a range of 0.1 to 20 μm.

EXAMPLES

The present invention is explained in further detail based on examples hereinafter. However, the following explanation describes the present invention for an illustration purpose and the content of the present invention is not limited to such a description.

[Embodiment 1]

(1) Production of Lightweight Clay

Following blending materials are stored in the inside of a kneader having a capacity of 100 litters and, thereafter, the kneader is rotated to produce the lightweight clay at a rotational speed of 40 rpm.

| | |
|---|---|
| i) White organic hollow micro spheres (Average particle size: 100 μm, whiteness degree (WL): not less than 50, weak alkali) | 0.35 kg (2.5 w %) |
| ii) Yellow pigment color element (solid content) (Average particle size: 0.086 μm, standard deviation: 0.026 μm, 95% range: 83 to 90 μm) | 0.10 kg (0.7 w %) |
| iii) Carboxymethylcellulose (etherification: 0.6) | 0.35 kg (2.5 w %) |
| iv) PVA (polymerization: 1.800, saponification: 95 mol %) | 1.05 kg (7.5 w %) |
| v) Wide-leaved pulp (Average fiber length: 1 mm) | 0.98 kg (7.0 w %) |
| vi) Water | 11.14 kg (79.6 w %) |
| vii) Phenol type antioxidant | 0.03 kg (0.2 w %) |

After uniformly mixing the blending materials, talc (density: 2.82 g/cm³) is added at a rate of 8 weight % with respect to a total quantity of the lightweight clay thus producing the lightweight clay of the example 1. The whiteness degree of the lightweight clay is measured using the color meter TC-180 OMK2 (made of Tokyo Denshoku Ltd.) Here, the blending of lightweight clay, which eliminates the yellow pigment color element, is employed in view of the above-mentioned blending.

(2) Evaluation of Lightweight Clay

Based on the obtained lightweight clay, the evaluations of following physical properties including moldability (film forming ability), lightweight characteristics, coloring characteristics, stickiness, swelling characteristics (preserving ability) are respectively performed. An obtained result (number n=average evaluation 5) is shown in Table 1.

1) Moldability

The moldability of the lightweight clay is evaluated based on following references. Here, when the evaluation "good" or more is obtained, it is possible to assert that the lightweight clay has the moldability suitable for the lightweight clay.

Very good: A film having a film thickness of not more than 0.2 mm can be formed using rollers.

Good: A film having a film thickness of not more than 1 mm can be formed using rollers.

Fair: A film having a film thickness of not more than 5 mm can be formed using rollers.

Bad: A film having a film thickness of not more than 5 mm cannot be formed even when rollers are used.

2) Lightweight Characteristics

The lightweight characteristics of the lightweight clay are evaluated based on following references. Here, when the evaluation "good" or more is obtained, it is possible to assert that the lightweight clay has the sufficient lightweight characteristics as the lightweight clay.

Very good: The density of the lightweight clay assumes a value not more than 0.3 g/cm$^3$.

Good: The density of the lightweight clay assumes a value not more than 0.5 g/cm$^3$.

Fair: The density of the lightweight clay assumes a value not more than 0.7 g/cm$^3$.

Bad: The density of the lightweight clay assumes a value which exceeds 0.7 g/cm$^3$.

3) Coloring Characteristics

The coloring characteristics of the lightweight clay are evaluated based on following references. Here, when the evaluation "good" or more is obtained, it is possible to assert that the lightweight clay has the favorable coloring characteristics as the lightweight clay.

Very good: The lightweight clay exhibits transparent clear color.

Good: The lightweight clay exhibits clear color.

Fair: The lightweight clay exhibits more or less clear color.

Bad: The lightweight clay exhibits unclear color.

Very bad: The lightweight clay exhibits mixed color, which is different from the added color elements.

4) Stickiness

The stickiness of the lightweight clay is evaluated by a finger touch based on following references. Here, when the evaluation "good" or more is obtained, it is possible to assert that the stickiness of the lightweight clay is favorable.

Very good: The lightweight clay has substantially no stickiness.

Good: The lightweight clay has more or less stickiness.

Fair: Although the lightweight clay has remarkable stickiness, the lightweight clay is not transferred to a finger.

Bad: The lightweight clay has remarkable stickiness and the lightweight clay is transferred to a finger.

5) Swelling Characteristics 100 g of the lightweight clay is molded into a rectangular shape and a periphery of the lightweight clay is packaged with a polyethylene film having a film thickness of 100 μm. In this state, the lightweight clay is held in an oven at a temperature of 40 degree centigrade for a week and, thereafter, a volume is measured and the swelling characteristics (storing characteristics) is evaluated under following references based on the relationship between the measured volume and an initial volume. Here, when the evaluation "Good" or more is obtained, it is possible to obtain the swelling characteristics (storing characteristics) suitable for the lightweight clay.

Very good: The volume change rate is less than 3%.

Good: The volume change rate is less than 10%.

Fair: The volume change rate is less than 30%.

Bad: The volume change rate is not less than 30%.

6) Weather-Ability

The weather-ability of the lightweight clay is evaluated based on following references. Here, when the evaluation "Good" or more is obtained, it is possible to assert that the lightweight clay has the weather-ability, which is favorable for the lightweight clay. Very good: The lightweight clay is not discolored even when ultraviolet rays are irradiated at a rate of 1000 mJ/cm$^2$.

Good: The lightweight clay is hardly discolored even when ultraviolet rays are irradiated at a rate of 500 mJ/cm$^2$.

Fair: The lightweight clay is slightly discolored when ultraviolet rays are irradiated at a rate of 500 mJ/cm$^2$.

Bad: The lightweight clay is remarkably discolored when ultraviolet rays are irradiated at a rate of 500 mJ/cm$^2$.

7) bleeding Resistance

The bleeding resistance of color pigments in the lightweight clay is evaluated based on following references. Here, when the evaluation "Good" or more is obtained, it is possible to assert that the color pigments have the favorable bleeding resistance.

Very good: The color pigments are not stuck to a hand even when the lightweight clay is kneaded by the hand for 5 minutes.

Good: The color pigment is hardly stuck to a hand even when the lightweight clay is kneaded by the hand for 5 minutes.

Fair: The color pigments are slightly stuck to a hand when the lightweight clay is kneaded by the hand for 5 minutes.

Bad: The color pigment is remarkably adhered to a hand even when the lightweight clay is kneaded by the hand for 5 minutes.

Examples 2 to 4 and Comparing Examples 1 to 3

As shown in Table 1, with respect to types of organic hollow micro spheres (brown acidic organic hollow micro spheres having the average particle size of 100 μm, the white degree (WL) of less than 50 and the L value of less than 50 being used in the example 4 and the comparing examples 1 to 3), the average particle size and the addition quantity are changed and, at the same time, respective addition quantities of fibers and water are also changed to produce the lightweight clays in the same manner as the example 1. The obtained lightweight clays are evaluated in the same manner as the example 1 and the obtained result is shown in Table 1.

As can be easily understood from the result, it has been found that when the addition quantity of the organic hollow micro spheres exceeds 5 weight %, the evaluation of moldability, coloring characteristics and swelling characteristics of the lightweight clay is remarkably lowered.

On the other hand, it has been also found that, different from the conventional finding, even when an addition quantity of fiber materials is less than 10 weight %, it is possible to achieve the sufficient lightweighting of the lightweight clay.

Still further, also with respect to an addition quantity of water, it has been also found that, different from the conventional finding, even when an addition quantity of water exceeds 60 weight %, the stickiness of the lightweight clay can be sufficiently adjusted to a proper value.

centigrade)) with respect to a total quantity (100 weight %) and a blending ratio between CMC and PVA, lightweight clays of these examples 5 to 8 and comparative examples are produced in the same manner as the embodiment 1. Subsequently, the obtained lightweight clays are evaluated in the same manner as the obtained lightweight clay of the example 1. The obtained result is shown in Table 2. As can be easily understood from the result, by adding a given quantity of the fluorescent whitening agent, it is possible to easily adjust the whiteness degree (WL) of the obtained lightweight clays to a value not less than 50. Further, by adding a given quantity of the fluorescent whitening agent,

TABLE 1

|  | Example 1 | Example 2 | Example 3 | Example 4 | Comp-example 1 | Comp-example 2 | Comp-example 3 |
|---|---|---|---|---|---|---|---|
| Binder resin | PVA/CMC | PVA/CMC | PVA/CMC | PVA/CMC | PVA/CMC | PVA/CMC | PVA/CMC |
| Addition rate | 100/33 | 100/33 | 100/33 | 100/33 | 100/33 | 100/33 | 100/33 |
| Addition quantity (weight %) | 10 | 10 | 10 | 10 | 10 | 10 | 10 |
| Organic hollow micro spheres | | | | | | | |
| Average particle size ($\mu$m) | 100 | 100 | 110 | 40 | 40 | 40 | 40 |
| Addition quantity (weight %) | 2.5 | 2.0 | 2.9 | 4.0 | 7.0 | 10 | 15 |
| Whiteness degree (WL) | 88 | 88 | 88 | 78 | 78 | 78 | 78 |
| Fiber (weight %) | 7 | 7 | 7 | 7 | 25 | 20 | 15 |
| Water (weight %) | 79.6 | 80.1 | 79.2 | 78.1 | 57.1 | 59.1 | 59.1 |
| Color element (weight %) | 0.7 | 0.7 | 0.7 | 0.7 | 0.7 | 0.7 | 0.7 |
| Evaluation of characteristics | | | | | | | |
| 1) Whiteness degree (WL) | 98 | 99 | 95 | 91 | 48 | 49 | 49 |
| 2) Moldability | Very good | Very good | Very good | Fair | Fair | Bad | Bad |
| 3) Lightweight characteristics | Good | Very good | Very good | Very good | Very good | Very good | Very good |
| 4) Coloring characteristics | Very good | Very good | Very good | Fair | Bad | Bad | Bad |
| 5) Stickiness | Very good | Very good | Very good | Very good | Very good | Very good | Very good |
| 6) Swelling characteristics | Very good | Very good | Good | Fair | Bad | Bad | Bad |
| 7) Weather-ability | Good | Good | Good | Good | Bad | Bad | Bad |
| 8) Bleeding resistance | Very good | Very good | Very good | Very good | Very good | Very good | Very good |

Examples 5 to 8 and Comparative Examples 4 to 6

As shown in Table 2, except for changing a quantity of fluorescent whitening agent (anionic sulfonic acid stilbene compound, nature: liquid, density: 1.22 g/cm$^3$, pH: 8 to 9, viscosity: 30 to 50 mPa·s (measuring temperature: 20 degree it is also possible to remarkably improve the weather-ability and the coloring characteristics. Accordingly, even when the formed lightweight clay is placed for a long time at a location, which receives sun beams through a window, it is expected that the excellent coloring characteristics can be maintained.

TABLE 2

|  | Example 5 | Example 6 | Example 7 | Example 8 | Comp-example 4 | Comp-example 5 | Comp-example 6 |
|---|---|---|---|---|---|---|---|
| Binder resin | PVA/CMC | PVA/CMC | PVA/CMC | PVA/CMC | PVA/CMC | PVA/CMC | PVA/CMC |
| Addition rate | 100/16 | 100/16 | 100/16 | 100/16 | 100/16 | 100/16 | 100/16 |
| Addition quantity (weight %) | 10 | 10 | 10 | 10 | 10 | 10 | 10 |
| Organic hollow micro spheres | | | | | | | |
| Average particle size ($\mu$m) | 100 | 90 | 110 | 40 | 40 | 40 | 40 |
| Addition quantity (weight %) | 2.5 | 2.0 | 2.9 | 4.0 | 7.0 | 10 | 15 |
| Whiteness degree | 88 | 88 | 88 | 68 | 68 | 68 | 68 |

TABLE 2-continued

|  | Example 5 | Example 6 | Example 7 | Example 8 | Comp-example 4 | Comp-example 5 | Comp-example 6 |
|---|---|---|---|---|---|---|---|
| (WL) | | | | | | | |
| Fiber (weight %) | 3 | 5 | 7 | 10 | 25 | 20 | 15 |
| Water (weight %) | 83.6 | 82.1 | 79.2 | 75.1 | 57.1 | 59.1 | 59.1 |
| Color elements (weight %) | 0.7 | 0.7 | 0.7 | 0.7 | 0.7 | 0.7 | 0.7 |
| Fluorescent whitening agent (weight %) | 0.05 | 0.1 | 0.3 | 0.5 | 0.1 | 0.1 | 0.1 |
| Evaluation of characteristics | | | | | | | |
| 1) Whiteness degree (WL) | 98 | 99 | 99 | 99 | 61 | 68 | 75 |
| 2) Moldability | Very good | Very good | Very good | Fair | Fair | Bad | Bad |
| 3) Lightweight characteristics | Good | Very good | Very good | Very good | Very good | Very good | Very good |
| 4) Coloring characteristics | Very good | Very good | Very good | Very good | Bad | Bad | Bad |
| 5) Stickiness | Very good | Very good | Very good | Very good | Very good | Very good | Very good |
| 6) Swelling characteristics | Very good | Very good | Good | Fair | Bad | Bad | Bad |
| 7) Weather-ability | Very good | Very good | Very good | Very good | Good | Good | Good |
| 8) Bleeding resistance | Very good | Very good | Very good | Very good | Very good | Very good | Very good |

The fluorescent whitening agent is added with respect to a total quantity (100 weight %) of the lightweight clay.

To recapitulate the advantageous effects obtained by the present invention, they are as follows.

According to the lightweight clay of the present invention, by setting the average particle size of the organic hollow micro spheres to a value which falls within a range of 15 to 150 μm, by setting an addition quantity of organic hollow micro spheres to a value which falls within a range of 0.1 to 6 weight % of a total quantity of the lightweight clay, and by setting the whiteness degree (WL) of the lightweight clay measured in accordance with JIS L 0803 to a value not less than 50, it is possible to provide the lightweight clay which can exhibit the excellent coloring characteristics, the excellent moldability and the excellent lightweight characteristics. It is also possible to provide the lightweight clay which can exhibit the excellent storing characteristics by solving the swelling problem even when the lightweight clay is stored for a long period in a state that the lightweight clay is covered with the packaging material or the lightweight clay is subjected to the high temperature state due to the elevation of ambient temperature during a summer season or the like. It is still further possible to provide the lightweight clay, which can be manufactured at a low cost.

Further, in the lightweight clay of the present invention, by setting a blending ratio of CMC and PVA to a value which falls within a range of 100:40 to 100:500, the lightweight clay can be easily molded into a given shape and it is also possible to realize thinning of film, for example, the reduction of the film thickness to not more than 0.1 mm, which has been difficult with the conventional lightweight clay, whereby the lightweight clay can be used in applications such as ornamental papers or folded paper crafts.

Further, in the lightweight clay of the present invention, by adding a given quantity of color pigments having the average particle size of 0.05 to 0.2 μm and by setting the standard deviation of the particle size distribution thereof to not more than 0.05 μm to the lightweight clay, the lightweight clay can obtain the extremely excellent coloring characteristics and, at the same time, can obtain the excellent weather-ability and the excellent bleeding resistance of the color pigments.

Still further, in the manufacturing method of the lightweight clay of the present invention, by using the organic hollow micro spheres having the average particle size whose value falls within a range of 15 to 150 μm, by mixing the organic hollow micro spheres using the kneader, by setting an addition quantity of the organic hollow micro spheres to a value which falls within a range of 0.1 to 6 weight % with respect to a total quantity, and by setting the whiteness degree (WL) of the lightweight clay measured in accordance with JIS L 0803 to not less than 50, it is possible to provide the lightweight clay which exhibits the excellent coloring characteristics, the excellent moldability, the excellent lightweight characteristics and the excellent storing characteristics (swelling characteristics) at a low cost.

What is claimed is:

1. A lightweight clay comprising:

organic hollow micro spheres; and binder resin; and an average particle size of the organic hollow micro spheres is set to a value, which falls within a range of 15 to 150 μm;

an amount of the organic hollow micro spheres is set to a value which falls within a range of 0.1 to less than 3 weight % with respect to a total quantity of the lightweight clay, when a density of constituent materials other than the organic hollow micro sphere is less than 0.5 to 0.8 g/cm$^3$, and is set to a value which falls within a range of 0.1 to 6 weight % with respect to a total amount of the lightweight clay, when a density of constituent materials other than the organic hollow micro sphere is 0.8 to 5 g/cm$^3$; and the whiteness degree (WL) of the lightweight clay measured in accordance with JIS L 0803 is set to a valu not less them 70.

2. The lightweight clay according to claim 1, wherein the whiteness degree (WL) of the organic hollow micro spheres measured in accordance with JIS L 0803 is set to not less than 50.

3. The lightweight clay according to claim 1, wherein the lightweight clay further contains a polar compound of a hydroxyl group containing compound and a carboxyl group containing compound, or a polar compound of either one of the hydroxyl group containing compound and the carboxyl group containing compound as a binder resin, and an amount of the polar compound is set to a value which falls within a range of 0.1 to 30 weight % with respect to a total amount of the lightweight clay.

4. The lightweight clay according to claim 3, wherein when the lightweight clay contains carboxymethylcellulose and polyvinyl alcohol as the hydroxyl group containing compound and the carboxyl group containing compound and does not contain a fluorescent whitening agent, a blending ratio (weight ratio) between the carboxymethylcellulose and the polyvinyl alcohol is set to a value which falls within a range of 100:40 to 100:500, and when the lightweight clay contains carboxymethylcellulose and polyvinyl alcohol as the hydroxyl group containing compound and the carboxyl group containing compound and also contains the fluorescent whitening agent, a blending ratio (weight ratio) between the carboxymethylcellulose and the polyvinyl is set to a value which falls within a range of 100:550 to 100:2000.

5. The lightweight clay according to claim 1, wherein the lightweight clay further contains a fiber and an additional amount of the fiber is set to a value which falls within a range of 1 to less than 10 weight % with respect to a total amount of the lightweight clay.

6. The lightweight clay according to claim 1, wherein the lightweight clay further contains water and an amount of the water is set to a value which falls within a range of 61 to 85 weight % with respect to a total amount of the lightweight clay.

7. The lightweight clay according to claim 1, wherein the lightweight clay further contains a color element and an amount of the color element is set to a value which falls within a range of 0.01 to less than 10 weight % with respect to a total amount of the lightweight clay.

8. The lightweight clay according to claim 1, wherein the lightweight clay further contains a filler and an amount of the filler is set to a value which falls within a range of 0.1 to less than 20 weight % with respect to a total amount of the lightweight clay.

9. A lightweight clay comprising:
organic hollow micro spheres;
a binder resin; and
a fluorescent whitening agent;
an amount of the fluorescent whitening agent is set to a value which falls within a range of 0.001 to less than 5 weight % with respect to a total amount of the lightweight clay;
an average particle size of the organic hollow micro sphere is set to a value, which falls within a range of 15 to 150 $\mu$m;
an amount of the organic hollow micro spheres is set to a value which is not more than 6 weight % of a total amount of the lightweight clay; and
the whiteness degree (WL) of the lightweight clay measured in accordance with JIS L 0803 is set to a value not less than 70.

10. The lightweight clay according to claim 9, wherein surfaces of the organic hollow micro spheres are subjected to a surface treatment by the fluorescent whitening agent.

11. The lightweight clay according to claim 9, wherein based upon an amount of the organic hollow micro spheres of F1 and an amount of the fluorescent whitening agent as F2, a value of F1/F2 is set to a value which falls within a range of 1 to 100.

12. A lightweight clay comprising:
organic hollow micro spheres;
a binder resin; and
a color element; and
an average particle size of the organic hollow micro spheres is set to a value, which falls within a range of 15 to 150 $\mu$m;
an amount of the organic hollow micro spheres is set to a value which is not more than 6 weight % of a total amount of the lightweight clay;
an average particle size of the color element is set to a value which falls within a range of 0.05 to 0.2 $\mu$m and, at the same time, a standard deviation in the particle size distribution is set to a value less than 0.05 $\mu$m; and
the whiteness degree (WL) of the lightweight clay measured in accordance with JIS L 0803 is set to a value not less than 70.

13. The lightweight clay according to claim 12, wherein based upon an average particle size of the color element as D1 and the average particle size of the organic hollow micro spheres as D2, a ratio of D2/D1 is set to a value which falls within a range of 10 to 50,000.

14. A lightweight clay comprising:
organic hollow micro spheres;
inorganic hollow micro spheres; and
a binder resin; and
an average particle size of the organic hollow micro sphere is set to a value, which falls within a range of 15 to 150 $\mu$m;
an amount of the organic hollow micro spheres is set to a value which is not more than 6 weight % of a total amount of the lightweight clay;
an amount of the inorganic hollow micro sphere is set to a value which falls within a range of 0.01 to 10 weight % with respect to a total amount of the lightweight clay; and
the whiteness degree (WL) of the lightweight clay measured in accordance with JIS L 0803 is set to a value not less than 70.

15. A lightweight clay comprising:
organic hollow micro spheres;
a binder resin;
a color element; and
a fluorescent whitening agent; and
an amount of the fluorescent whitening agent is set to a value which falls within a range of 0.001 to less than 5 weight % with respect to a total amount of the lightweight clay;
the surfaces of the organic hollow micro spheres are subjected to a surface treatment by the fluorescent whitening agent;
an average particle size of the color element is set to a value which falls within a range of 0.05 to 0.2 $\mu$m and, at the same time, a standard deviation in the particle size distribution is set to a value less than 0.05 $\mu$m;
based upon an average particle size of the color element as D1 and the average particle size of the organic hollow micro spheres as D2, a ratio of D2/D1 is set to a value which falls within a range of 10 to 50,000; and
the whiteness degree (WL) of the lightweight clay measured in accordance with JIS L 0803 is set to a value not less than 70.

16. A method of manufacturing a lightweight clay containing organic hollow micro spheres and a binder resin, the method comprising:
an amount of organic hollow micro spheres having an average particle size falling within a range of 15 to 150

μm is set to a value which falls within a range of 0.1 to less than 3 weight % with respect to a total amount of the lightweight clay, when a density of constituent materials other than the organic hollow micro spheres is less than 0.5 to 0.8 g/cm$^3$, and is set to a value which falls within a range of 0.1 to 6 weight % with respect to a total amount of the lightweight clay, when a density of constituent materials other than the organic hollow micro spheres is 0.8 to 5 g/cm$^3$;

mixing the organic hollow micro spheres and the binder resin in a kneader; and setting the whiteness degree (WL) of the lightweight clay measured in accordance with JIS L 0803 to a value which is not less than 70.

17. A method of manufacturing a lightweight clay containing organic hollow micro spheres and a binder resin and a fluorescent whitening agent, the method comprising:

an amount of the organic hollow micro spheres having an average particle size falling within a range of 15 to 150 μm is set to a value which falls within a range of 0.1 to less than 3 weight % with respect to a total amount of the lightweight clay, when a density of constituent materials other than the organic hollow micro sphere is less than 0.5 to 0.8 g/cm$^3$, and is set to a value which falls within a range of 0.1 to 6 weight % with respect to a total amount of the lightweight clay, when a density of constituent materials other than the organic hollow micro sphere is 0.8 to 5 g/cm$^3$;

mixing the organic hollow micro spheres and the binder resin in a kneader; and the whiteness degree (WL) of the lightweight clay measured in accordance with JIS L 0803 is set to a value, which is not less than 70.

* * * * *

UNITED STATES PATENT AND TRADEMARK OFFICE
CERTIFICATE OF CORRECTION

PATENT NO. : 6,676,743 B2
DATED : January 13, 2004
INVENTOR(S) : T. Yamamuro

It is certified that error appears in the above-identified patent and that said Letters Patent is hereby corrected as shown below:

<u>Column 30,</u>
Line 57, "valu" should be -- value --.
Line 58, "them" should be -- than --.

<u>Column 31,</u>
Line 17, after "polyvinyl" insert -- alcohol --.

Signed and Sealed this

Seventeenth Day of August, 2004

JON W. DUDAS
*Acting Director of the United States Patent and Trademark Office*